US008464338B2

(12) United States Patent
Okubo

(10) Patent No.: US 8,464,338 B2
(45) Date of Patent: Jun. 11, 2013

(54) INFORMATION PROCESSING DEVICE WITH USER AUTHENTICATION THAT RESTORES PREVIOUS OPERATION CONDITION

(75) Inventor: Tomoaki Okubo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 411 days.

(21) Appl. No.: 12/320,811

(22) Filed: Feb. 5, 2009

(65) Prior Publication Data
US 2009/0204804 A1 Aug. 13, 2009

(30) Foreign Application Priority Data

Feb. 8, 2008 (JP) ................................. 2008-029275

(51) Int. Cl.
*G06F 21/00* (2006.01)
(52) U.S. Cl.
USPC .......................................................... 726/19
(58) Field of Classification Search
USPC ........................................... 380/243; 726/19
See application file for complete search history.

(56) References Cited

U.S. PATENT DOCUMENTS

| 2003/0151760 | A1* | 8/2003 | Berndt et al. | 358/1.14 |
| 2004/0128389 | A1* | 7/2004 | Kopchik | 709/228 |
| 2004/0139326 | A1* | 7/2004 | Ootsuka et al. | 713/176 |
| 2004/0153675 | A1* | 8/2004 | Dorn et al. | 713/202 |
| 2005/0152544 | A1* | 7/2005 | Kizawa | 380/55 |
| 2005/0185214 | A1* | 8/2005 | Suwabe | 358/1.15 |
| 2006/0176501 | A1* | 8/2006 | Yoshiura et al. | 358/1.15 |
| 2006/0209359 | A1* | 9/2006 | Kadowaki | 358/474 |
| 2007/0083752 | A1* | 4/2007 | Kanou et al. | 713/156 |
| 2007/0121155 | A1* | 5/2007 | Machiyama | 358/1.15 |
| 2007/0180253 | A1* | 8/2007 | Hamaguchi | 713/176 |
| 2007/0212027 | A1* | 9/2007 | Terao | 386/95 |
| 2007/0212100 | A1* | 9/2007 | Kimoto et al. | 399/81 |
| 2007/0216938 | A1* | 9/2007 | Tomita | 358/1.15 |
| 2008/0083028 | A1* | 4/2008 | Koizumi | 726/19 |
| 2008/0085052 | A1* | 4/2008 | Sasamori et al. | 382/190 |
| 2008/0168542 | A1* | 7/2008 | Sato | 726/5 |

FOREIGN PATENT DOCUMENTS

JP   A-08-125823   5/1996

\* cited by examiner

*Primary Examiner* — Michael S McNally
(74) *Attorney, Agent, or Firm* — Posz Law Group, PLC

(57) ABSTRACT

An information processing device includes an authenticating part that authenticates user, an authentication canceling part that cancels authentication of the user when the authenticating part authenticated, and removes setting information and screen information input by the user; an operation condition storing part that stores the setting information and the screen information input by the user in an external memory medium when canceling authentication of the user, and a reproducing part that reads the setting information and the screen information stored in the external memory medium from the external memory medium when the authenticating part authenticates the user, and reproduces an operation condition based on the setting information and the screen information that were read.

26 Claims, 17 Drawing Sheets

Fig. 8

```
<?xml version="1.0" encoding="utf-8"?>
<!-- Information to reproduce condition of operating part -->
<operation_condition>
<!-- Memorize condition of screen displayed on operating part -->
<display_condition screen_name = "fax_transmission.setting.phone_number" value_during_input = "123"></display_condition>
<!-- Memorize setting information that is already input -->
<setting_value_of_function function_name = "fax_transmission">
<setting_value name = "phone number of transmission destination" value = "0001112222, 0001113333"></setting_value>
<setting_value name = "document size" value = "A4"></setting_value>
<setting_value name = "image quality" value = "medium"></setting_value>
<setting_value name = "image quality" value = "normal"></setting_value>
</setting_value_of_function>
</operation_condition>
```

```xml
<?xml version="1.0" encoding="utf-8"?>
<!-- Information to reproduce condition of operating part -->
<operation_condition>
<!-- Memorize condition of screen displayed on operating part -->
<display_condition screen_name = "copy.setting" value_during_input = ""></display_condition>
<!-- Memorize setting information that is already input -->
<setting_value_of_function function_name = "copy">
<setting_value name = "number of copy" value = "1"></setting_value>
<setting_value name = "enlarge ratio" value = "100%"></setting_value>
<setting_value name = "document size" value = "A4"></setting_value>
<setting_value name = "image quality" value = "high"></setting_value>
<setting_value name = "density" value = "normal"></setting_value>
</setting_value_of_function>
</operation_condition>
```

501

INFORMATION PROCESSING DEVICE WITH USER AUTHENTICATION THAT RESTORES PREVIOUS OPERATION CONDITION

CROSS REFERENCE TO RELATED APPLICATION

The present application is related to, claims priority from and incorporates by reference Japanese Patent Application No. 2008-029275, filed on Feb. 8, 2008.

TECHNICAL FIELD

This invention relates generally to information processing devices, and particularly to an information processing device having a user authentication function.

BACKGROUND

In general, for an information processing device such as a multifunction machine that has several functions, such as a copier, a scanner, a printer and a facsimile machine (fax machine), one unit has a memory part that stores, for example, setting information such as destination information of a fax for each individual user so that an unspecified number of users can use the device.

For this kind of information processing device, in order to simplify input of the setting information by the unspecified number of users, an external memory medium, for example, a Floppy (™) disk or the like, can be used in order to simplify re-inputting of the setting information. See, for example, Japanese Laid-Open Application Publication No. H08-125823.

However, with the information processing device of the above cited patent reference, even though input of the setting information by an unspecified number of users becomes easier, there is a risk that the setting information might leak to other users, as the setting information that is typed by a user remains in the information processing device even when the user suspends the input process during the input of setting information or when the user logs out of the information processing device.

SUMMARY

In view of the above risk, an information processing device is provided that can prevent leakage of the setting information to other users by removing (remotely storing or deleting) the setting information input by a user when the user logs out of the information processing device, and that can later reproduce the setting information input just before the user suspended the input of the setting information or when the user logged out of the information processing device.

In order to alleviate the aforementioned problems, the information processing device includes an authenticating part that authenticates a user, an authentication canceling part that cancels the authentication of the user and that removes/deletes setting information and screen information input by the user, an operation condition storing part that stores the setting information and the screen information input by the user in an external memory medium when the authentication canceling part cancels the authentication of the user; and a reproducing part that reads the setting information and the screen information stored in the external memory medium from the external memory medium when the authenticating part authenticates the user, and reproduces an operation condition based on the setting information and the screen information read from the external memory medium.

The information processing device has an authenticating part that authenticates the user who uses the information processing device. Moreover, the information processing device includes the authentication canceling part that cancels the authentication of the user authenticated by the authenticating part, and removes the setting information and the screen information input by the user. With the structure, the setting information input by the user is removed from the information processing device when the user authentication is canceled by the authenticating part such as when the user suspends the inputting process during the input of the setting information and when the user logs out of the information processing device. Moreover, at this time, the operation condition storing part instructs the external memory medium to store the setting information and the screen information input by the user. By reading the setting information and the screen information stored in this external memory medium, the reproducing part can reproduce the operation condition when the input of the setting information by the user was suspended, or immediately before the user logged out of the information processing device.

According to the information processing device, leakage of the setting information to other users can be prevented by removing, or deleting, the input setting information when the user suspends the inputting process during inputting the setting information or when the user logs out of the information processing device and remotely storing the input setting information. Thus, when the user uses the information processing device again, it is possible to reproduce the setting information input when the user suspended input of the setting information or when the user logged out of the information processing device.

BRIEF DESCRIPTION OF THE DRAWINGS

FIG. 8 illustrates exemplary operation condition data.

FIG. 9 is a flow diagram explaining the processing that is executed by the multifunction machine of FIG. 1 when a user is logged in.

FIG. 17 illustrates other exemplary operation condition data.

DETAILED DESCRIPTION

Hereafter, embodiments of the present invention are explained with reference to the drawings. The present embodiments are explained using an information processing device that includes a fax transmission part that performs transmission of fax signals with another information processing device of another party through a communication network, a scanning part that reads document images and creates image information read from the images, and a printing part that prints the image information based on the fax signal that was received though the fax transmission part or the image information that was created at the scanning part as an image on a recording medium The information processing device that has this kind of structure, for example, is capable of printing the image information on the recording medium as an image based on the fax signal transmitted from the other party's information processing device. Moreover, it is possible to transmit the fax signal based on the image read at the scanning part to the receiver's information processing device through the fax transmission part.

[First Embodiment]

Figure 1:
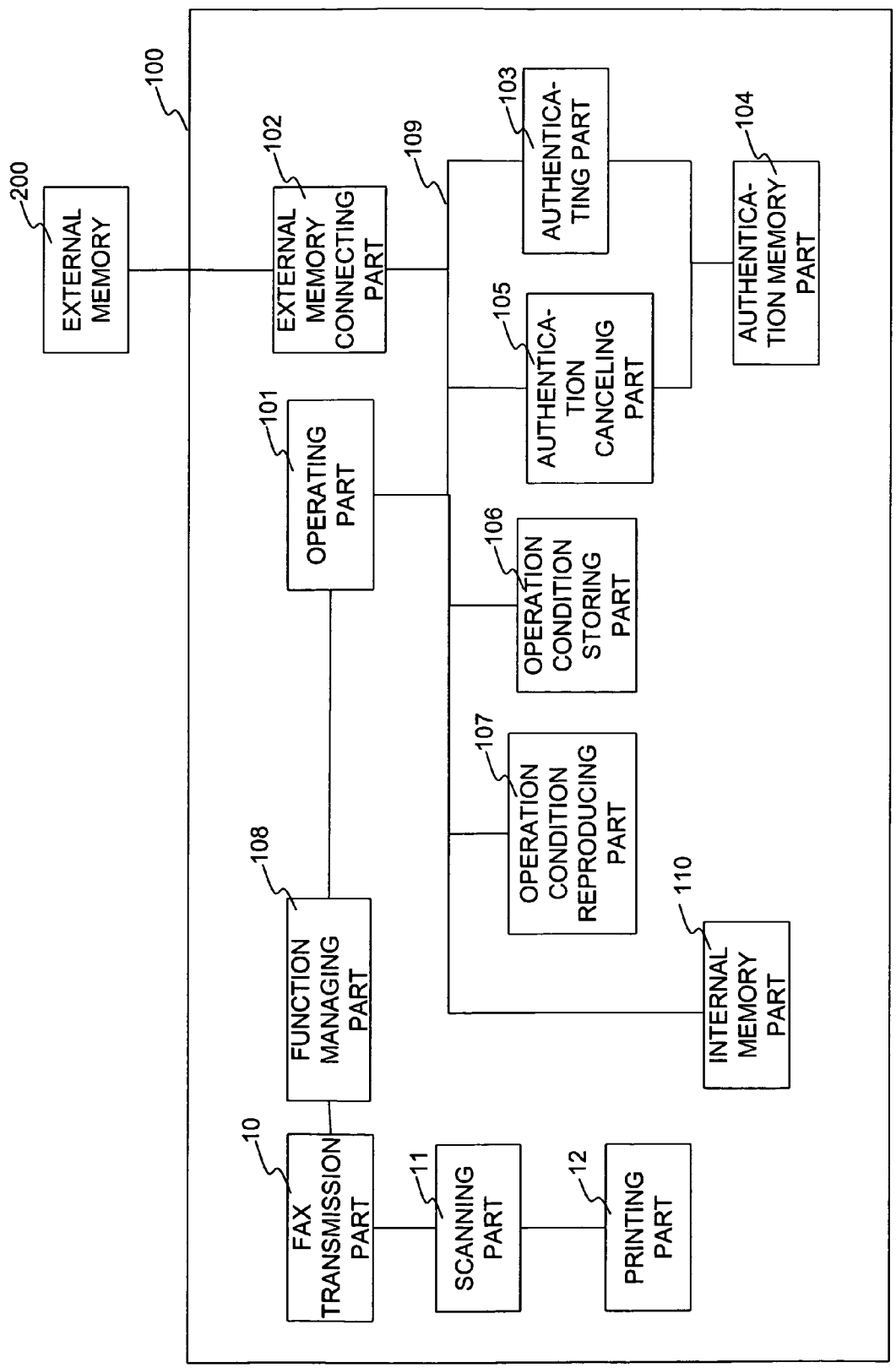
FIG. 1 is a schematic block diagram illustrating a structure of a multifunction machine.

FIG. 1 is a schematic block diagram illustrating the structure of a multifunction machine 100 as an information processing device of a first embodiment of the present invention. The multifunction machine 100 includes a fax transmission part 10 that converts the image information input from a scanning part 11 into a fax signal, and transmits the fax signal to the other party's communication device through a communication network, a scanning part 11 that reads images on documents based on the setting value designated by the user, and a printing part 12 that prints the information that was input from the fax transmission part 10 or the scanning part 11 as an image on paper. As shown in FIG. 1, the multifunction machine 100 further includes elements to realize the disclosed embodiment. These elements are identified by element numbers 101 to 110 in FIG. 1, as disclosed below.

Also, an internal memory part 110 temporarily stores a certain program that controls each part of the multifunction machine 100 and/or the setting information input by the user as operation condition data. An Operating part 101 displays each type of setting screen and accepts input of each type of setting information input by the user with respect to the displayed screen. An external memory connecting part 102 detects the attachment and removal of an external memory 200 as an external memory medium to/from the multifunction machine 100 and writes information on the external memory 200 that is connected to multifunction machine 100. An authenticating part 103 authenticates the user, an authentication memory part 104 stores the identification information and the authentication information of the user, and an authentication canceling part 105 cancels authentication of the user who is being authenticated.

An operation condition storing part 106 instructs the external memory 200 to store information such as the setting information that is input by the user or a screen condition (described in detail later) that is being displayed by the operating part 101. An operation condition reproducing part 107 reads information, such as the setting information input by the user or the screen condition displayed by the operating part 101, from the external memory 200, and instructs the operating part 101 to reproduce the operation condition. A function managing part 108 manages the fax transmission part 10, the scanning part 11 and the printing part 12, and provides them with an execution order based on the user's instructions. A bus 109 connects the operating part 101, the external memory connecting part 102, the authenticating part 103, the authentication canceling part 105, the operation condition storing part 106, the operation condition reproducing part 107 and the internal memory part 110.

The fax transmission part 10 converts digital signals of the image information input from the scanning part 11 so that the converted signals match the signal transmission bandwidth of the communication network and fax signal receiving ability of the receiver's communication device, and transmits the signals to the communication device of the receiver through the communication network. Moreover, it demodulates and digitally converts the fax signal transmitted from the sender's transmission device. The fax transmission part 10 can perform fax transmission according to well-known predetermined transmission controlling means.

The scanning part 11 is structured for example as a flat head scanner and reads images formed on a document placed on a platen glass. In detail, the scanning part 11 has a carriage that comprises a reading sensor constructed as a charge coupled device (CCD) image sensor that irradiates the document and receives light reflected by the document and a stepping motor that moves the carriage in the vertical direction with respect to the image reading direction or the like. This scanning part 11 scans the images formed on the document by moving the carriage according to the drive of the stepping motor. The reading result by the reading sensor is output as an analog image signal and converted into a digital signal by the A/D converter.

The printing part 12 has a sheet tray that contains sheets of printing paper, a pick-up roller that picks up the sheets from the sheet tray, transportation rollers that transport the sheets, an endless transportation belt that conveys the sheets toward an image forming unit, the electrophotographic image forming unit in which a toner image based on the input digital signal is formed on the sheets, a fixing unit that fixes the toner image that is formed on the sheets, discharge rollers that discharge the sheets in which the toner image is fixed to the outside, a drive part that drives each roller, and a power part that applies a high voltage to the predetermined member (or part) that is constructed as the printing unit or the fixing unit. When these members (or parts) operate together, the image input by the fax transmission part 10 or the scanning part 11 can be printed on the sheets.

The internal memory part 110 comprises a nonvolatile memory such as a read only memory (ROM) that stores predetermined programs and a volatile memory such as a random access memory (RAM) that functions as a work area used for a calculation device.

The operating part 101, for example, provides the display order of each kind of setting screen with respect to the display device (not shown in the figure), such as a liquid crystal display (LCD). As will be later explained, each type of setting screen has a unique name in order to identify it. Moreover, the operating part 101 accepts input of setting information made by the user through each kind of setting screen that is displayed on the display device. For example, a touch panel that is equipped with the display device can be used to accept the input of the setting information made by the user. Then the setting information input through the touch panel is stored in the internal memory part 110.

The external memory connecting part 102, for example, comprises an external machinery connecting interface and detects connection (or attachment)/disconnection of the external memory 200 as the external memory medium from the multifunction machine 100. Moreover, the external memory connecting part 102, based on instructions from the operation condition storing part 106 or the operation condition reproducing part 107 that are described later, performs writing or reading of the setting information that is input by the user and the screen condition that is being displayed by the operating part 101 to/from the external memory 200.

The authenticating part 103 evaluates whether the user has authority to use the multifunction machine 100. Authentication of the user using the authenticating part 103 is performed based on a collating result of the user ID (described later) that is stored in the external memory 200 and the password that was input by the user through the touch panel. After authentication, when it is evaluated that the user has authority to use the multifunction machine 100, the authenticating part 103 determines/identifies that this user has been authenticated by storing the user ID in the authentication memory part 104.

The authentication memory part 104, for example, includes a memory device such as a hard disk drive, and stores the user ID of the user until the authentication of the user who has been authenticated by the authenticating part 103 is canceled by the authentication canceling part 105. Moreover, the authentication memory part 104 stores the user information structured by the user ID and the password of the user that are referenced at the time of authentication of the user.

The authentication canceling part 105 cancels authentication of the user authenticated by the authenticating part 103. The authentication canceling part 105 cancels authentication when the user suspends input during the input of the setting information and when the user logs out of the multifunction machine 100. In detail, the authentication canceling part 105 deletes the user ID of the user that is stored in the authentication memory part 104 when there is no input of the setting information made by the user for a certain period of time or when the user is logged out of the multifunction machine 100. Moreover, the authentication canceling part 105 deletes the setting information stored in the internal memory part 110 when canceling the user ID, and orders the operating part 101 to suspend the display of the screen that is being displayed. When the authentication of the user is canceled by the authentication canceling part 105, the user has to be authenticated again later in order to use the multifunction machine 100.

The operation condition storing part 106 orders the external memory connecting part 102 to store the setting information that was input by the user and the screen condition that is being displayed by the operating part 101 or the like in the external memory 200 before the authentication canceling part 105 cancels the authentication of the user.

The operation condition reproducing part 107 orders the external memory connecting part 102 to read the setting information and the screen condition or the like that are stored in the external memory 200 when the user whose authentication was once canceled is authenticated again. The operation condition reproducing part 107 orders the operating part 101 to reproduce the screen condition just before the user's authentication was canceled based on the setting information and the screen condition that were read.

The function managing part 108 manages the fax receiving part 10, the scanning part 11 and the printing part 12. The function managing part 108 sends execution orders for a fax transmission, a scanning operation or a printing operation based on the order input by the user.

The bus 109 is a generic name for signal lines that connect the operating part 101, the external memory connecting part 102, the authenticating part 103, the authentication canceling part 105, the operation condition storing part 106, the operation condition reproducing part 107 and the internal memory part 110. When a signal is sent from each part, the destination is designated by adding a header that shows the destination to the signal.

The external memory 200 is the external memory medium wherein the setting information input by the user and the screen condition displayed by the operating part 101 are stored. Moreover, the user ID of the user that is used by the authenticating part 103 at the time of user authentication is stored in the external memory 200. For the external memory medium 200, a USB memory may be used in the embodiment of the present invention. Other detachable external memory mediums, which are capable of random access, easy recording and deleting, and high speed data processing, may alternatively be used. Examples of these kinds of mediums are Floppy disk™, out-of-contact/contact type IC cards, magnetic cards, optical disks, removable cartridge type hard disks or the like.

When the aforementioned parts are operated together, leakage of a user's setting information to other users can be prevented by deleting the setting information input by the user when the user suspends input in the middle of inputting of the setting information or when the user logs out of the multifunction machine 100. Also, when the user restarts using the multifunction machine 100, it becomes possible to reproduce the setting information input just before the user suspended input of the setting information or the user logged out of the information processing device.

Figure 2:
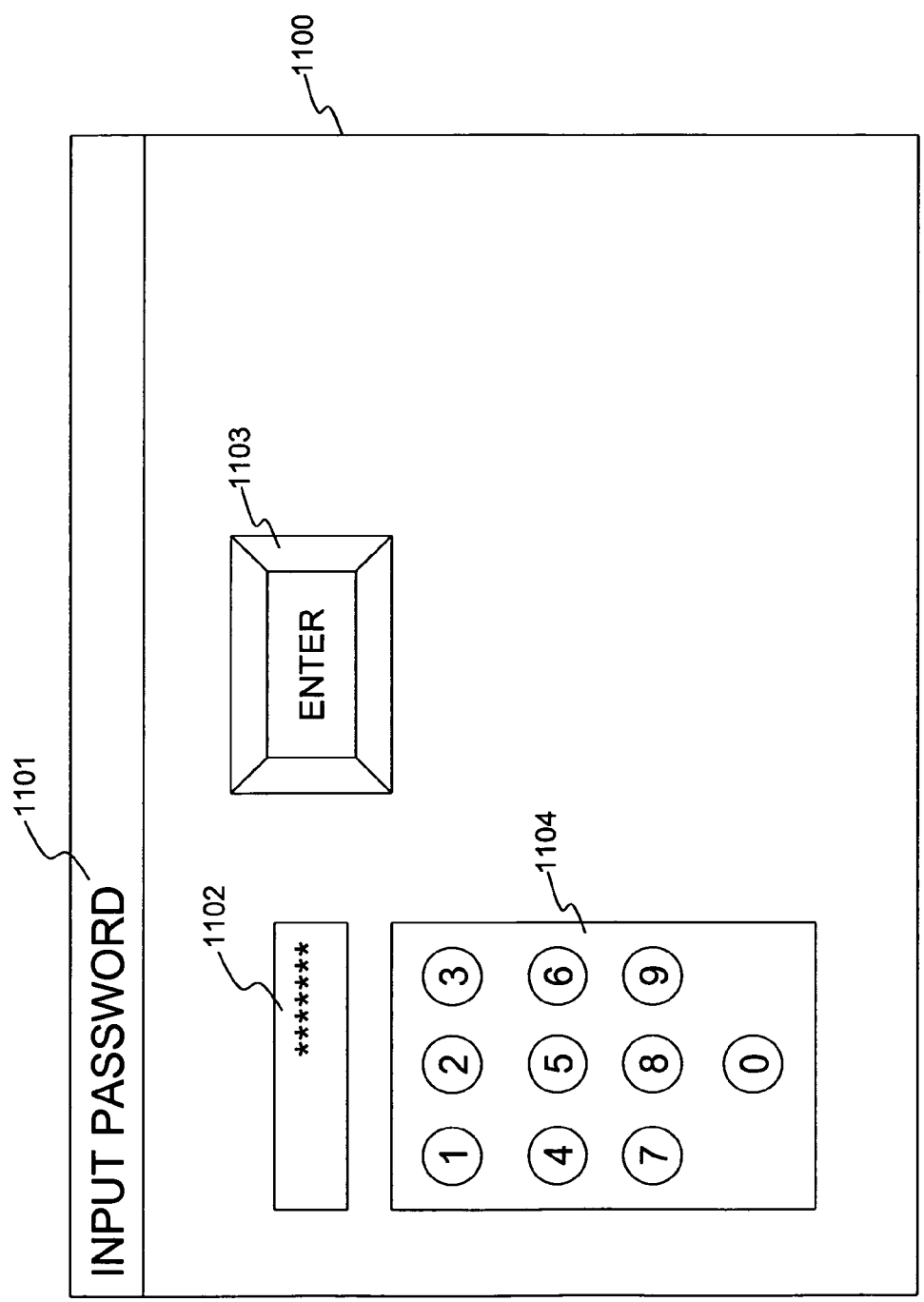
FIG. 2 illustrates a password input screen displayed by an operating part of the multifunction machine of FIG. 1.

Next, the display screen that is displayed by the operating part 101 during the inputting of the setting information by the user is explained. FIG. 2 illustrates a password input screen that is displayed by the operating part 101 when the user is logged in to the multifunction machine 100.

The password input screen 1100 comprises a title bar 1101, an input box 1102, a decision button 1103 and a virtual keyboard 1104. The name of the screen INPUT PASSWORD is displayed on the title bar 1101. The password being input by the user is displayed in the input box 1102. However, the symbols "*" are displayed rather than the actual input characters for security purposes. The decision button 1103 is pressed of accept entry of a completed password. The virtual keyboard 1104 accepts the input of password characters one at a time. When the round-shaped number buttons on the virtual keyboard are pressed by the user, numbers associated with each of the pressed buttons are accepted as being input. The input password is used for user authentication by the authenticating part 103.

Figure 3:
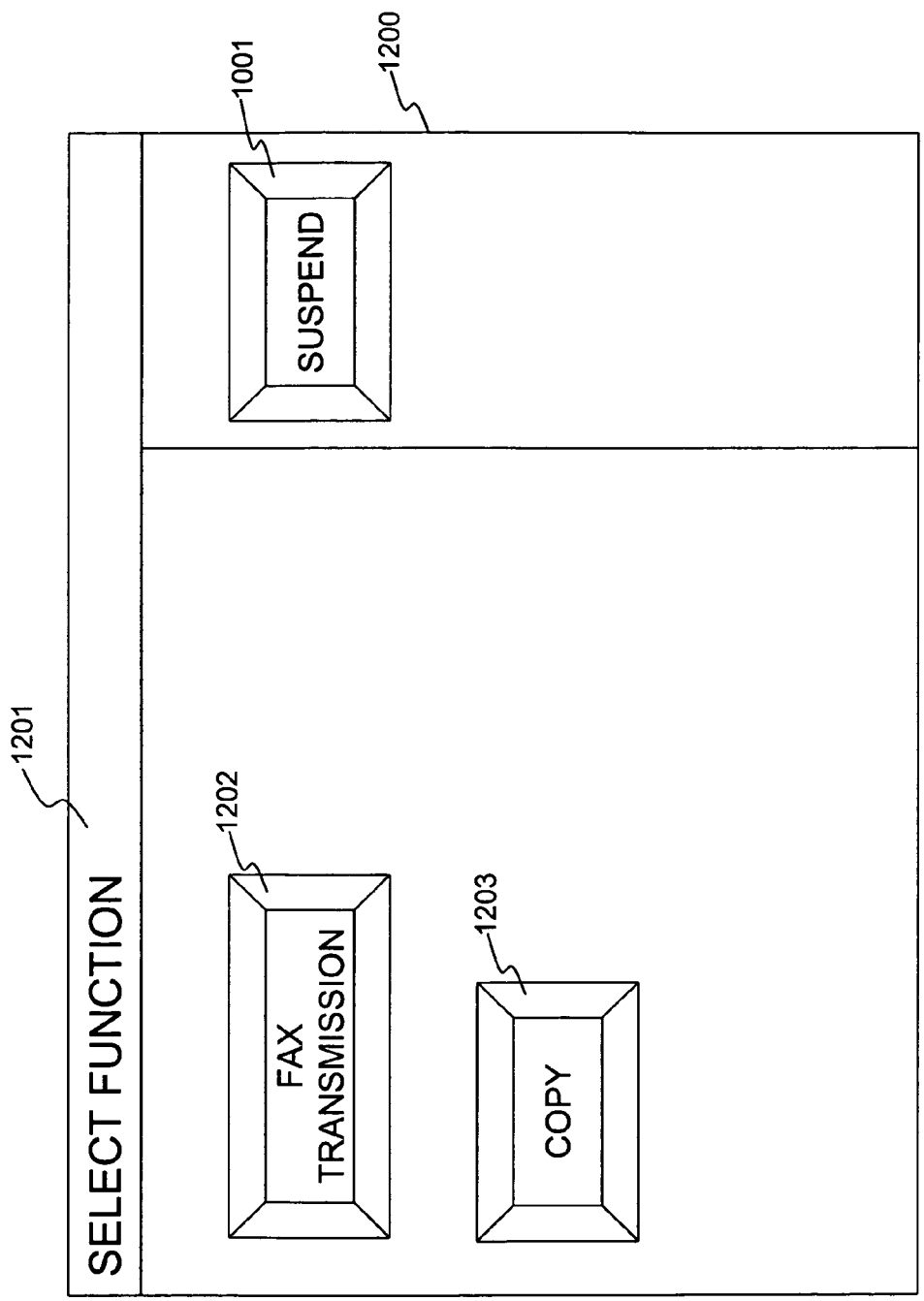
FIG. 3 illustrates a function selecting screen displayed by the operating part of FIG. 2.

FIG. 3 illustrates a function selecting screen 1200 that is displayed by the operating part 101 when the user is selecting a function of the multifunction machine 100. The function selecting screen 1200 includes a title bar 1201, a FAX TRANSMISSION button 1202, a COPY button 1203 and a SUSPEND button 1001.

On the title bar 1201, the term SELECT FUNCTION is displayed on the screen. The FAX TRANSMISSION button 1202 is the button to accept a selection of the fax transmission function made by the user. When the FAX TRANSMISSION button 1202 is pressed by the user, the fax transmission function is selected, and the operating part 101 switches the display screen to the fax transmission setting screen that is explained later. The COPY button 1203 is the button to accept a selection of the copy function made by the user. When the COPY button 1203 is pressed by the user, the copy function is selected, and the operating part 101 switches the display screen to the copy screen that is explained later. The SUSPEND button 1001 is the button to accept the suspension of processing by the user. When the SUSPEND button 1001 is pressed by the user, the operating part 101 suspends the processing.

Figure 4:
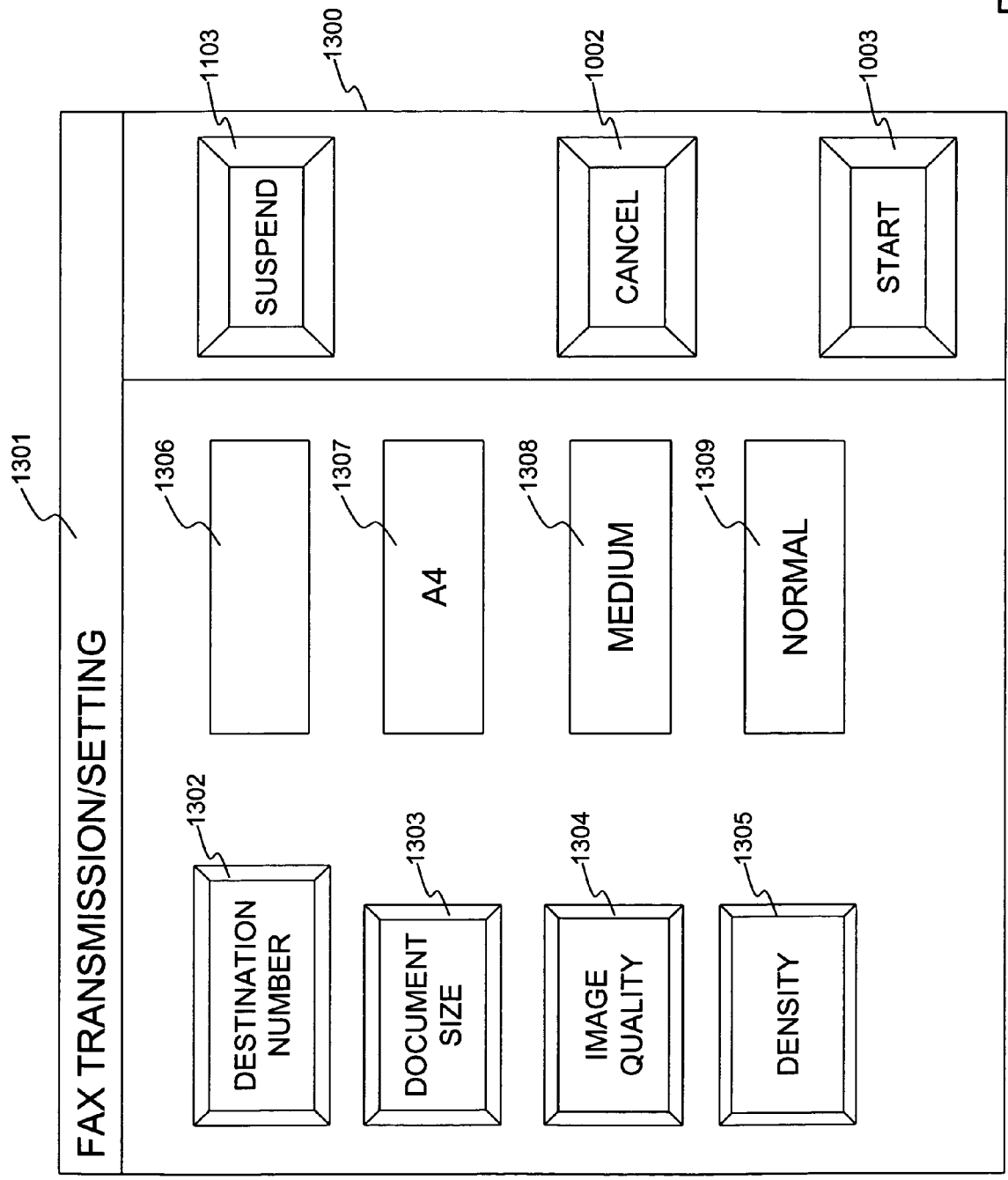
FIG. 4 illustrates a fax transmission setting screen displayed by the operating part of FIG. 2.

FIG. 4 illustrates a fax transmission setting screen 1300 that is displayed by the operating part 101 as a result of the FAX TRANSMISSION button 1202 being pressed by the user. The fax transmission setting screen 1300 includes a title bar 1301, setting value buttons 1302-1305, setting value display boxes 1306-1309, a SUSPEND button 1001, a CANCEL button 1002 and a START button 1003.

On the title bar 1301, the term FAX TRANSMISSION/SETTING is displayed on the screen. The names of the setting values are displayed on the setting value buttons 1302-1305. When each of the setting value buttons 1302-1305 is pressed, the screen that is to change the setting values that correspond to each name is displayed by the operating part 101.

The term DESTINATION NUMER is displayed on the setting button 1302. Here, fax numbers of fax transmission destinations can be designated. Multiple fax numbers can be designated. The term DOCUMENTS SIZE is displayed on the setting value button 1303. Here, the document size for the scanning part 11 to read can be selected. With the multifunction machine 100 of the present embodiment, a desired document size can be selected from three paper sizes A4/LETTER/LEGAL. The term IMAGE QUALITY is displayed on the setting value button 1304. Here, the image quality of the transmission part 10 can be selected. With the multifunction machine 100 of the present embodiment, a desired image can be selected from three types of image quality: LOW/MEDIUM/HIGH. The term DENSITY is displayed on the setting value button 1305. Here, the image density on the document read by the scanning part 11 can be selected. With the multifunction machine 100 of the present embodiment, a desired density can be selected from three types of density: THIN/NORMAL/THICK.

In the setting value display boxes of 1306-1309, the setting values designated and selected by the user are displayed respectively on the setting value buttons 1302-1305. The destination number designated at the setting value button 1302 is displayed on the setting value display box 1306. On the setting value display box 1307, the document size selected at the setting value button 1303 is displayed. Moreover, the fact that the document size of A4 is selected as an initial value is displayed on the setting value display box 1307. On the setting value box 1308, the image quality selected at the setting value button 1304 is displayed. Moreover, on the setting value display box 1308, the image quality of LOW is selected as an initial value. On the setting value box 1309, the density that was selected at the setting value button 1305 is displayed. Moreover, on the setting value display box 1309, the density of NORMAL is selected as an initial value is displayed.

The SUSPEND button 1001 is the button to accept suspension of processing by the user. When the SUSPEND button 1001 is pressed by the user, the operating part 101 suspends processing. The CANCEL button 1002 accepts cancellation of processing by the user. When the CANCEL button 1002 is pressed by the user, the operating part 101 abandons the setting value that was input, and switches the display to the function selecting screen 1200. The START button 1003 is the button to accept a user's execution order to start fax transmission. When the START button 1003 is pressed by the user, the operating part 101 sends the execution order to start fax transmission to the function managing part 108.

Figure 5:
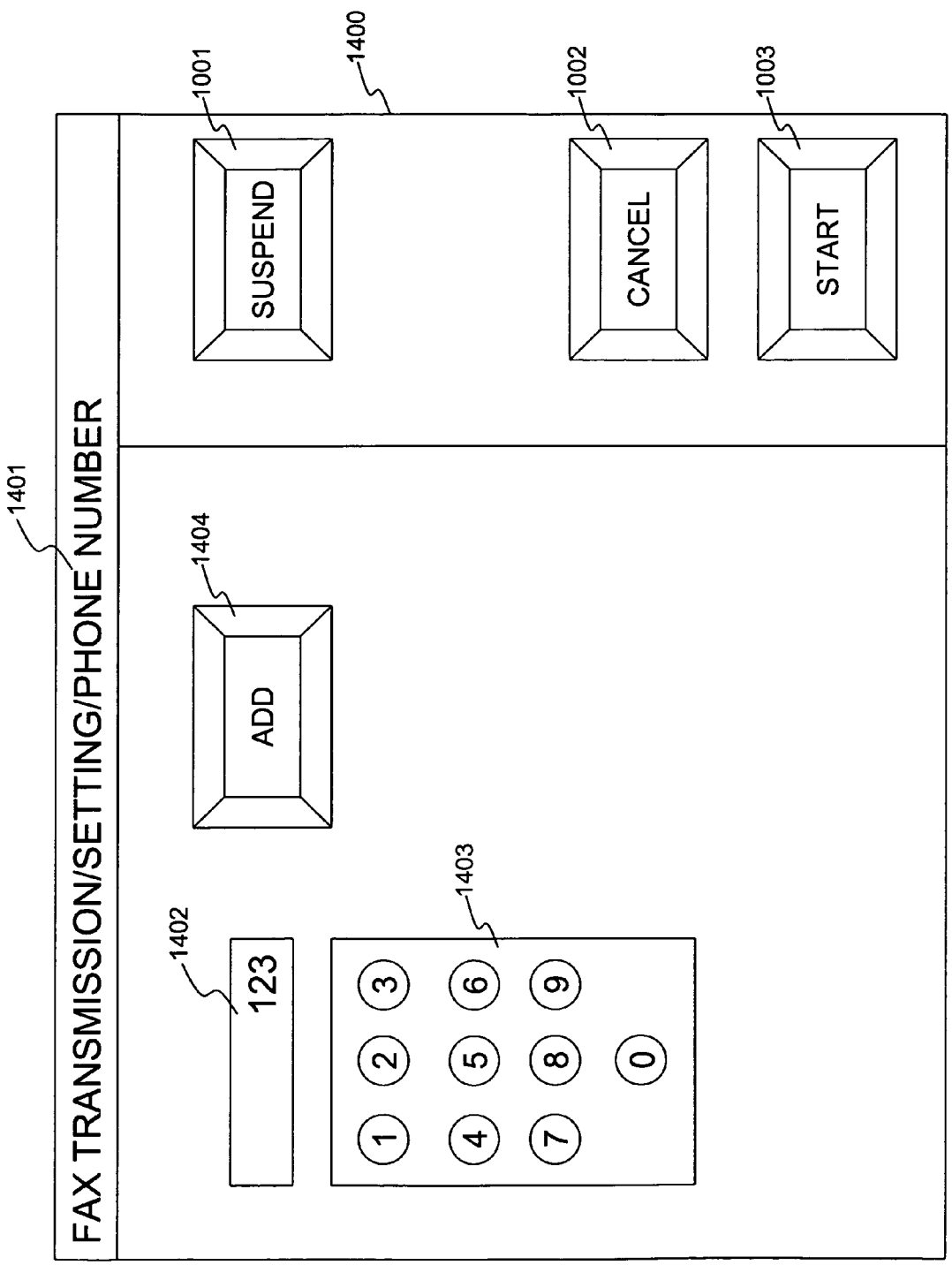
FIG. 5 illustrates a fax transmission destination number setting screen (FTDN setting screen) displayed by the operating part of FIG. 2.

One example of a screen displayed by the operating part 101 when one of the aforementioned setting value buttons 1302-1305 is pressed by the user is explained using FIG. 5 hereafter. FIG. 5 illustrates a fax transmission destination number setting screen (FTDN setting screen) 1400 that is displayed by the operating part 101 after the setting value button 1302 is pressed by the user. The FTDN setting screen 1400 includes a title bar 1401, an input box 1402, a virtual keyboard 1403 and an ADD button 1404, a SUSPEND button 1001, a CANCEL button 1002 and a START button 1003.

The terms: FAX TRANSMISSION/SETTING/PHONE NUMBER are displayed on the title bar 1401. In the input box 1402, the destination number being input by the user is displayed. The virtual keyboard 1403 accepts characters of the destination number one at a time. When the round-shaped number button of the virtual keyboard 1403 is pressed by the user, the number on the pressed button is accepted as an input number. The ADD button 1404 accepts the addition of the destination number that was input by the user.

When the ADD button 1404 is pressed by the user, the input destination number is added as one of the destination numbers that corresponds to the setting value DESTINATION NUMBER of the fax transmission function. Moreover, when the ADD button 1404 is pressed, the operating part 101 switches the display to the fax transmission setting screen 1300. The SUSPEND button 1001 is the button to accept processing suspension made by the user. When the SUSPEND button 1001 is pressed by the user, the operating part 101 suspends processing. Moreover, when the SUSPEND button 1001 is pressed while the user is inputting the destination number in the condition of when the FTDN setting screen 1400 is being displayed, the operating part 101 instructs the internal memory part 110 to store the destination number during the input as "value during input" that is an attribute of "display condition."

The CANCEL button 1002 is the button to accept cancellation of processing by the user. When the CANCEL button 1002 is pressed by the user, the operating part 101 abandons the input setting value and switches the display to the fax transmission setting screen 1300. The START button 1003 is the button to accept the execution order of fax transmission start by the user. When the START button is pressed by the user, the operating part 101 sends the execution order to start fax transmission to the function managing part 108.

Figure 6:
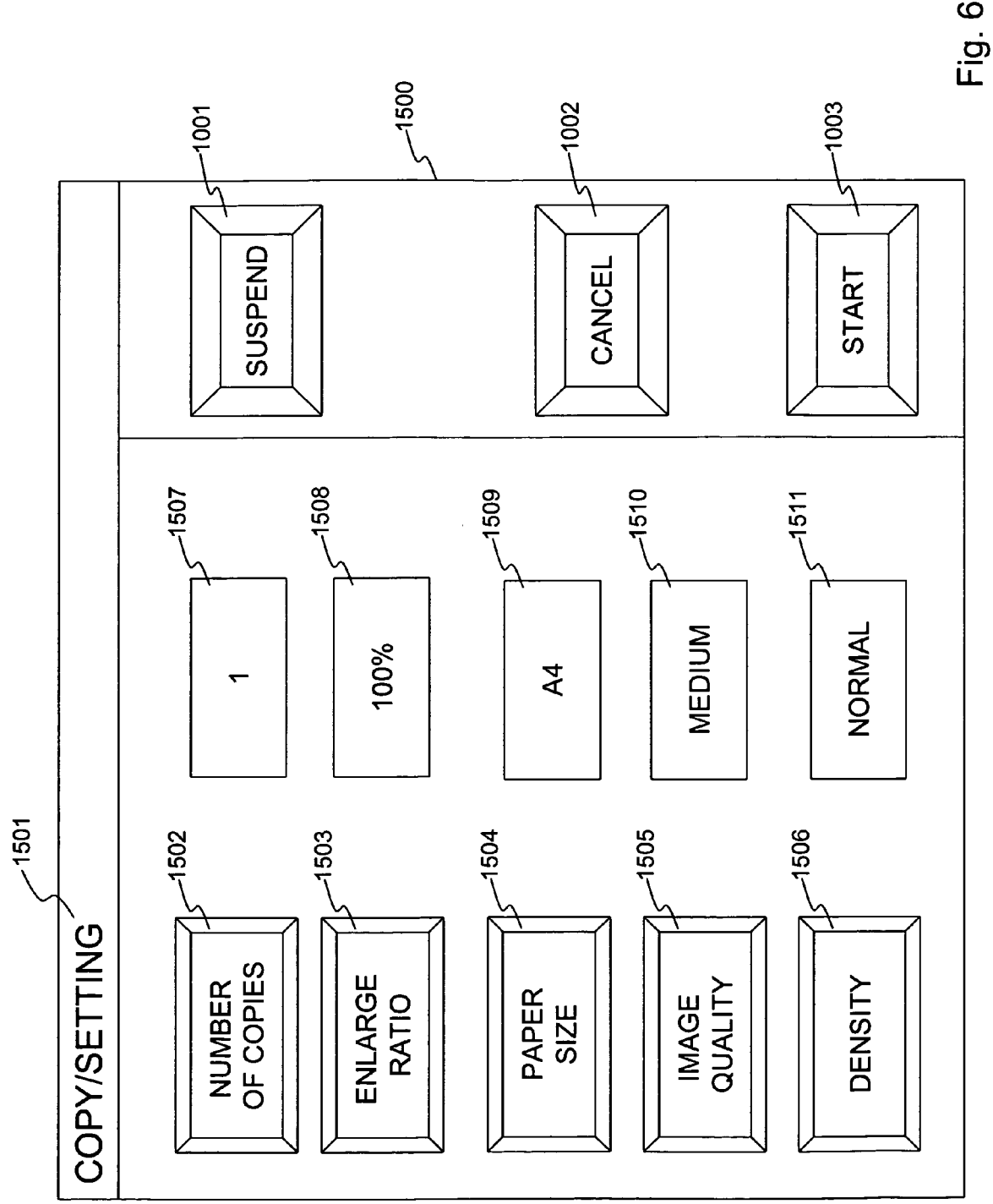
FIG. 6 illustrates a copy setting screen displayed by the operating part of FIG. 2.

FIG. 6 illustrates the COPY/SETTING screen 1500 that is displayed by the operating part 101 after the COPY button 1203 was pressed by the user at the function selecting screen 1200 of FIG. 3. The copy setting screen 1500 includes a title bar 1501, setting value buttons 1502-1506, setting value display boxes 1507-1511, a SUSPEND button 1001, a CANCEL button 1002 and a START button 1003.

On the title bar 1501, the term COPY/SETTING that is a name of the screen is displayed. The names of the setting values are displayed on the setting value buttons 1502-1506, and the setting value buttons accept changes of the setting values that correspond to the names. When each of setting value buttons 1502-1506 is pressed, the screen that changes the setting values corresponding to the button name(s) is displayed on the operating part 101.

The term NUMBER OF COPIES is displayed on the setting value button 1502. Here, the number of copies of an image of the document that was read by the scanning part 11 can be set. With the multifunction machine 100 of the present embodiment, the number of copies (1-99) can be set. The term ENLARGE RATIO is displayed on the setting value button

1503. Here, the enlargement ratio of the image that to be printed on the document can be set. An enlargement ratio of 25-400% can be set with the multifunction machine 100 of the present embodiment. The term PAPER SIZE is displayed on the setting value button 1504. Here, the size of the paper provided for printing can be selected. A desired paper size can be selected from three sizes of A4/LETTER/LEGAL with the multifunction machine 100 of the present embodiment. The image quality of the image that is going to be printed on the sheet can be selected on/with/by the setting value button 1505. With the multifunction machine 100 of the present embodiment, a desired image quality can be selected among three image qualities of LOW/MIDDLE/HIGH. The image density of the image to be printed on the document can be selected with the setting value button 1506. With the multifunction machine 100 of the present embodiment, a desired density can be selected among three densities of THIN/NORMAL/THICK.

In the setting value display boxes 1507-1511, the setting values that were designated and set by the user on the setting value buttons 1502-1506 are displayed respectively. In the setting value display box 1507, the number of copies set on the setting value button 1502 is displayed. Moreover, in the setting value display box 1507, "1" is displayed as an initial value. In the setting value display box 1508, the enlargement ratio set on the setting value button 1503 is displayed. Moreover, in the setting value display box 1508, "100%" is displayed as an initial value. In the setting value display box 1509, the document size selected at the setting value button 1504 is displayed. Moreover, in the setting value box 1509, the document size A4, selected as an initial value is displayed. In the setting value box 1510, the image quality set on the setting value button 1505 is displayed. Moreover, in the setting value box 1510, MEDIUM, is selected is displayed. In the setting value box 1511, the density selected at the setting value button 1506 is displayed.

Moreover, in the setting value display box 1511, the density, NORMAL, is selected as an initial value is displayed. The SUSPEND button 1001 is the button to accept suspension of processing by the user. When the SUSPEND button 1001 is pressed by the user, the operating part 101 suspends the processing. The CANCEL button 1002 is the button to accept canceling of processing from the user. When the CANCEL button 1002 is pressed, the operating part 101 abandons the input setting value and switches the display to the function selection screen 1200. The START button 1003 is the button to accept the execution order to start copying from the user. When the START button 1003 is pressed by the user, the operating part 101 sends the execution order to start copying to the function managing part 108.

Figure 7:
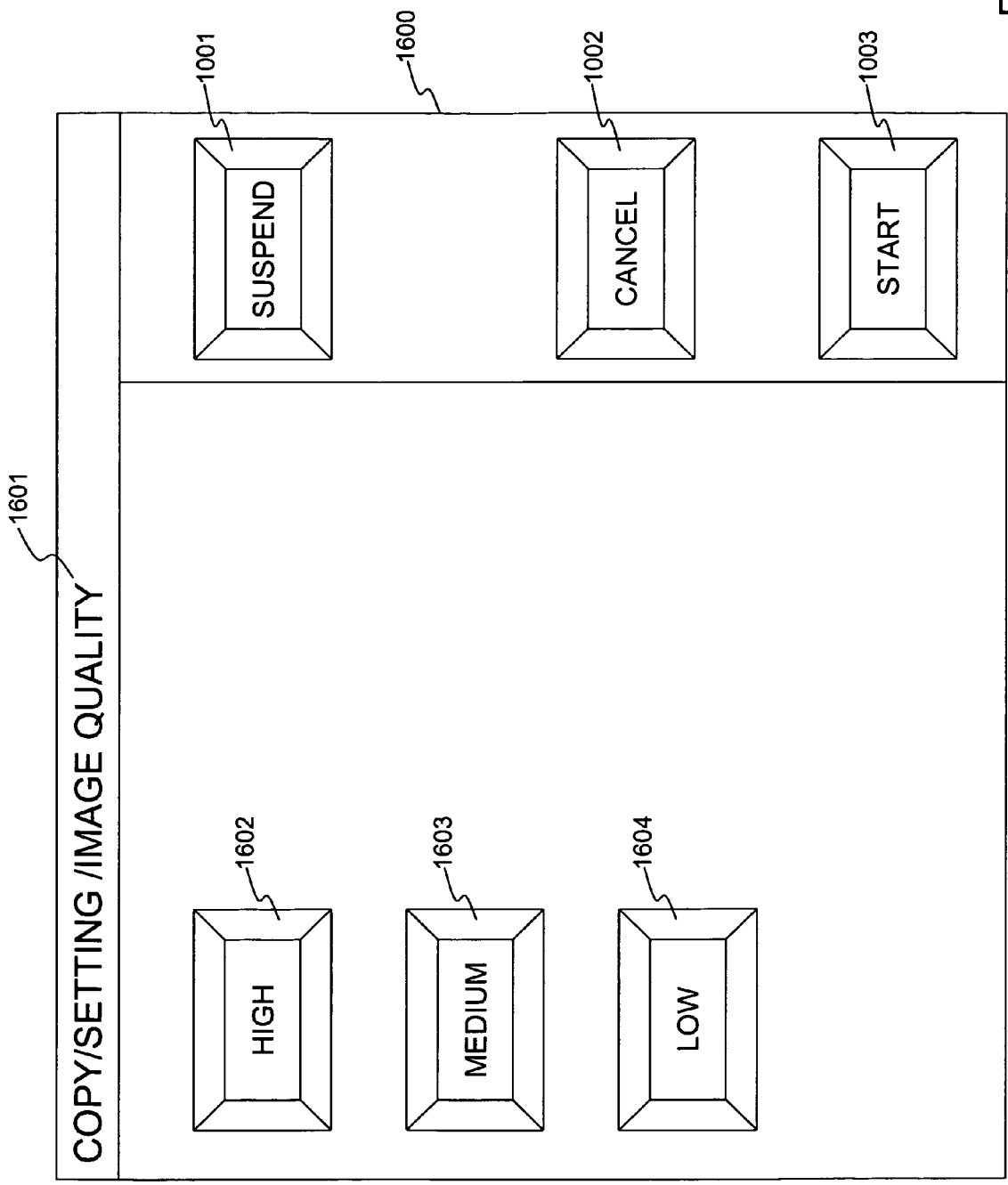
FIG. 7 illustrates a copy image quality screen displayed by the ope rating part of FIG. 2.

One example of the screen displayed by the operating part 101 when any of the setting value buttons of 1502-1506 is pressed by the user is explained hereafter with reference to FIG. 7. FIG. 7 illustrates a copy image quality setting screen 1600 displayed by the operating part 101 after the setting value button 1505 is pressed by the user. The copy image quality setting screen 1600 includes a title bar 1601, value buttons 1602-1604, a SUSPEND button 1001, a CANCEL button 1002 and a START button 1003.

On the title bar 1601, the names of the screen, COPY/SETTING/IMAGE QUALITY, are displayed. On the value buttons 1602-1604, image qualities of HIGH, MEDIUM, and LOW are displayed respectively. When any of the value buttons of 1602-1604 is selected, the operating part 101 changes the value of the image quality to the selected value, and switches the display to the copy setting screen 1500. The SUSPEND button 1001 accepts the suspension of the processing by the user. When the SUSPEND button 1001 is pressed by the user, the operating part 101 suspends processing. The CANCEL button 1002 accepts cancellation of processing by the user. When the CANCEL button is pressed by the user, the operating part 101 switches the display to the function selecting screen 1200. The START button 1003 accepts the execution order to start copying by the user. When the START button 1003 is pressed by the user, the operating part 101 provides an execution order to start copying to the function managing part 108.

Next, operation condition data is explained. The operation condition data is in a format in which the operation condition storing part 106 stores the setting information and screen condition or the like set by the user in the external memory 200 based on the aforementioned setting screen. FIG. 8 is an example explaining the operation condition data 500.

The operation condition data 500 is stored as a character string in extensible markup language (XML) format. As for the sub-elements of the element that describe "Operation condition," there are "Display condition" and "Setting value of function." The screen information displayed by the operating part 101 is stored in the "Display condition," and "screen name" and "value during input" are maintained as attributes. Here, "screen name" means a name of the screen that is displayed on the title bar of the screen, and corresponds to the type of the screen.

Moreover, the "value during input" is a value that was input and stored until the SUSPEND button 1001 was pressed during the input by the user. The setting value with respect to the function that was going to be executed by the operating part 101 is stored in the "Setting value of the function." The "Setting value of the function" maintains "function name" as the attribute and also includes "setting value" of multiple (0-n) sub-elements. Here, "function name" is the name of the function. For example, if it is a fax transmission function, it is termed "fax transmission," and it is termed "copy" in case of a copy function. The "setting value" is data that is stored as one unit of "name" and "value" for one setting value per element.

The processing that is executed by the multifunction machine 100 that has the below mentioned structure is explained hereafter. As the processing that the multifunction machine 100 executes is generally classified into: 1) processing regarding user login; 2) fax transmission or copy function processing; and 3) processing for suspending processing by the user. Processing regarding user login is explained with reference to FIG. 9. Fax transmission or copy function processing is explained with reference to FIG. 10. Processing for suspending processing by the user is explained with reference to FIG. 11.

Figure 9:
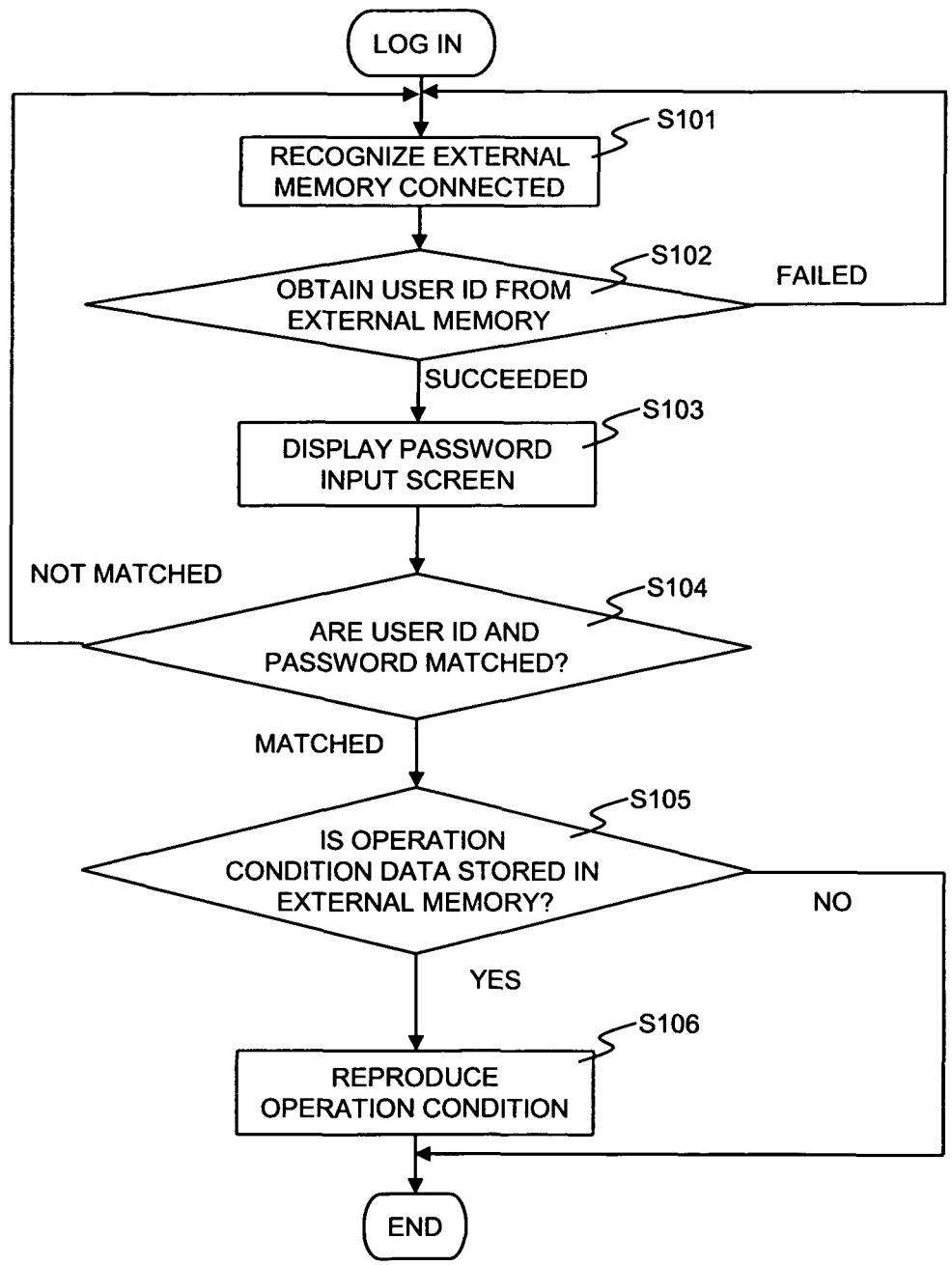

FIG. 9 is a flow diagram illustrating processing executed by the multifunction machine 100 when the user logs in. First of all, when the external memory 200 is connected to the multifunction machine 100, the external memory connecting part 102 recognizes that the external memory 200 is connected (S101).

Next, at S102, the external memory connecting part 102 obtains the user ID that is stored in the external memory 200. At this point, when the external memory connecting part 102 fails to obtain the user ID, it stands by until the external memory 200 is reconnected to the multifunction machine 100 (S102, FAILED). Once the external memory connecting part 102 successfully obtains the user ID (S102, SUCCEEDED), it reports the same to the operating part 101 and the authenticating part 103.

The operating part 101 that received a report that the user ID was obtained from the external memory connecting part 102 displays the password input screen 1100 on the display device (S103). When the password is input by the user, the operating part 101 reports the input password to the authenticating part 103. Next, the authenticating part 103 authenticates the user referring to the user information that is stored in the authentication memory part 104 based on the user ID that the external memory connecting part 102 obtained and the password that the operating part 101 accepted. When the user is authenticated by the authenticating part 103 (user ID and password are matched), the authenticating part 103 instructs the authentication memory part 104 to store the user ID, and reports the fact that the user was authenticated to the operation condition reproducing part 107 (S104, MATCHED). On the other hand, when the user is not authenticated by the authenticating part 103, it stands by until the external memory 200 is reconnected to the multifunction machine 100 (S104, NOT MATCHED).

The operation condition reproducing part 107, which receives a report that the user was authenticated by the authenticating part 103, sends an order to the external memory part 200 to confirm whether or not the operation condition data is stored in the external memory 200. Here, when the operation condition data is not stored in the external memory part 200, the operation condition reproducing part 107 finishes the processing, and reports the same to the operating part 101. The operating part 101 that received the report from the operation condition reproducing part 107 instructs the display device to display the function displaying screen 1200 (S105, NO).

On the other hand, when the operation condition data is stored in the external memory 200 (S105, YES), the operation condition reproducing part 107 sends an order to the external memory connecting part 102 to read the operation condition data 500. The operation condition reproducing part 107 reproduces the operation condition of the multifunction machine 100 based on the operation condition data 500 that was read from the external memory connecting part 102 (S106). In detail, the operation condition reproducing part 107 refers to the "display condition" and "setting value of the display" that is stored in the operation condition data, and reports "screen name" and "value during input" that are stored in "display condition" to the operating part 101.

The operating part 101 that received the report displays the screen that corresponds to "screen name" and the setting value in which the user was in the middle of inputting on that screen. Moreover, the operation condition reproducing part 107 changes the setting value of the multifunction machine 100 based on the setting value with respect to the function saved in the "setting value of the function." By performing this processing, processing regarding the login of the user is executed.

Figure 10:
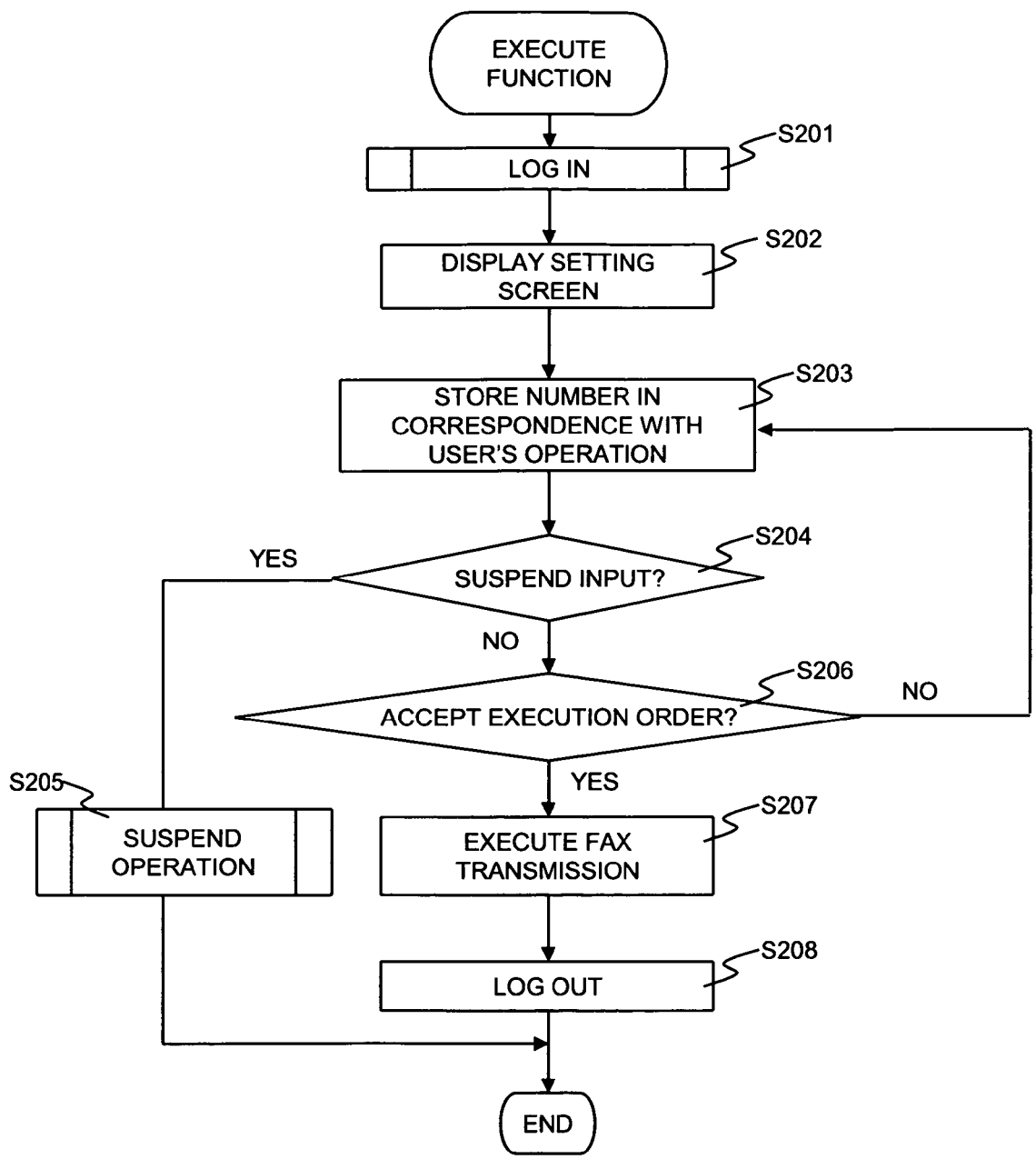
FIG. 10 is a flow diagram explaining the processing that executes the fax transmission function.

FIG. 10 is a flow diagram illustrating the processing to execute, for example, a fax transmission function after the user has logged in to the multifunction machine 100. First of all, when the user has logged in to the multifunction machine 100 according to the processing explained in FIG. 9 (S201), the operating part 101 displays the setting screen based on the processing of the operation condition reproducing part 107 (S202). In this case, when the reproducing condition was reproduced by the operation condition reproducing part 107, the reproduced screen is displayed. Moreover, when the operation condition was not reproduced by the operation condition reproducing part 107, the function selecting screen 1200 is displayed. Hereafter, a case when the operation condition was not reproduced by the operation condition reproducing part 107 is explained.

For example, at the function selecting screen 1200, when the FAX TRANSMISSION button 1202 is pressed by the user, the operating part 101 accepts the selection of the fax transmission function, and displays the setting screen 1300 on the display device. At the fax transmission setting screen 1300, when the user clicks the setting value button 1302, the operating part 101 displays the FTDN setting screen 1400 on the display device. When the user operates the virtual keyboard 1403 and inputs a number (for example, "0001112222") and clicks the ADD button 1404, the operating part 101 accepts the input fax number, and instructs the internal memory part 110 to store the number. The accepted fax number is displayed in the setting value display box 1306 on the fax transmission setting screen 1300.

When the user clicks the setting button 1302 again, the operating part 101 displays the FTDN setting screen 1400 on the display device again. Here, when the user operates the virtual keyboard 1403 to input a number (for example, "0001113333") and clicks the ADD button 1404, the operating part 101 accepts the input fax number, and instructs the internal memory part 110 to store the number (S203). The accepted fax number is added to the fax number with the previously input fax number "0001112222," and is displayed as "0001112222, 0001113333" in the setting value display box 1306 on the fax transmission setting screen 1300.

When there is no suspension with respect to setting information input by the user (S204, NO), and when the START button 1003 of the fax transmission setting screen 1300 is pressed, the operating part 101 accepts an execution order of the fax transmission (S206, YES). The operating part 101 that accepted the execution order of fax transmission sends the execution order of fax transmission to the function managing part 108. The function managing part 108 manages the fax transmission part 10 based on the setting information input by the user, and executes the fax transmission (S207). When there is a suspension input by the user (S204, YES), the operation is suspended (S205). When the operating part 101 does not accept an execution order of the fax transmission (S206, NO), the operation returns to S203.

After the fax transmission is executed by the fax transmission part 10, the function managing part 108 informs the authentication canceling part 105 of the fact that the fax transmission was completed. The authentication canceling part 105 then cancels the user's authentication and logs the user out as well as deletes the operation condition data 500 that is stored in the internal memory part 110. Moreover, the authentication canceling part 105 orders the operating part 101 to cancel the display of the screen that is currently displayed. By doing this processing fax transmission or copying function processing is executed.

Figure 11:
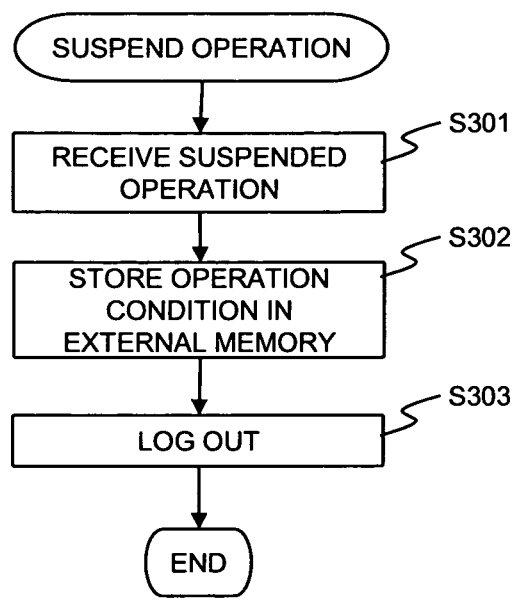
FIG. 11 is a flow diagram explaining the processing that suspends processing by the user.

The flow diagram in FIG. 11 illustrates, for example, processing that is executed by the multifunction machine 100 when input of the setting information is suspended by the user at S204 of FIG. 10. Here, the situation where the SUSPEND button 1001 is pressed after the user inputs the numbers "0001112222, 0001113333" in the input box 1402 of the FTDN setting screen 1400, then operates the virtual keyboard 1403 to input the number "123" at S204 of FIG. 10 is explained.

First, at S301, the operating part 101 informs the operation condition storing part 106 that the operation was suspended when receiving notice regarding suspension of operation made by the user. The operation condition storing part 106 orders the external memory connecting part 102 to store the operation condition data 500 that has been stored in the internal memory part 110. The external memory connecting part 102 that accepted the order reads the operation condition data 500 from the internal memory part 110 and stores the operation condition data in the external memory 200 (S302). After this, the operation condition storing part 106 informs the authentication canceling part 105 that the operation condition data 500 has been stored in the external memory 200. The authentication canceling part 105 that accepted the notice cancels the user's authentication and logs the user out (S303) and also deletes the operation condition data 500 that is stored in the internal memory part 110. Moreover, the authentication canceling part 105 orders the operating part 101 to suspend the display of the screen that is currently displayed. By executing the aforementioned flow, processing for suspending processing by the user, is executed.

Next, the processing of the multifunction machine 100 when the user logs in again after the operation was once suspended and the user was logged out as explained in FIG. 11 will be explained hereafter. When the user reconnects the external memory 200 to the multifunction machine 100, the authentication of the user is executed as explained in FIG. 9. The operation condition reproducing part 107 that was informed that the user was authenticated by the authenticating part 103 orders the external memory connecting part 102 to confirm whether or not the operation condition data is stored in the external memory 200.

At this time, as explained in FIG. 11, the operation condition data 500 is stored in the external memory 200. The external memory connecting part 102 reads the operation condition data 500 and provides the operation condition data 500 that was read to the operation condition reproducing part 107. The operation condition reproducing part 107 reproduces an operation based on the operation condition data 500 that is provided. In detail, the operation condition reproducing part 107 instructs the operating part 101 to display the FTDN setting screen 1400 because the attribute "screen title" of "display condition" stored in the operation condition data 500 is FAX TRANSMISSION/SETTING/PHONE NUMBER. Moreover, the operation condition reproducing part 107 instructs the operating part 101 to display the number "123" in the input box 1402 of the FTDN setting screen 1400 as "value during input," which is the attribute of "display condition" is "123." The operating part 101 that accepted the order displays the FTDN setting screen 1400 on the display device, and displays the number "123" in the input box 1402 of the FTDN setting screen 1400.

Moreover, the operation condition reproducing part 107 sets the destination numbers, "0001112222, 0001113333," the document size A4, the image quality MEDIUM, and the color density NORMAL as the fax transmission setting values from each one of "function name" that is the attribute of the "setting value of function" and "setting value" that are sub-elements stored in the operation condition data 500.

Here, further to the number "123" that is displayed on the input box 1402 in the FTDN setting screen 1400, when the user operates the virtual keyboard 1403 and inputs the number "456789," then clicks the ADD button 1404, the operating part 101 accepts adding the fax number, "12345678." The accepted fax number is added to the fax number of "0001112222, 0001113333," and the numbers "0001112222, 0001113333, 123456789" are displayed in the setting value display box 1306. After this, the fax transmission is started when the user clicks the START button 1003. In short, the scanning part 11 starts to read with the setting of the document size A4, image quality MEDIUM and color density NORMAL.

The output analog image signal is provided to the fax transmission part 10 after being converted into a digital signal. The fax transmission part 10 coverts the digital signal so that it is adapted to the signal transmission bandwidth of the communication network and to the fax signal receiving ability of the receiving side communication device or the like, and transmits the converted digital signal to the fax numbers "0001112222, 0001113333 and 123456789." The processing of the multifunction machine 100 after the fax transmission was previously described.

The present embodiment stores the operation condition in the external memory 200 depending on the operation suspension order from the user. However, the embodiment can be modified so that the operation condition is stored every time the user changes the operation condition in the external memory 200, and the user is logged out when the external memory connecting part 102 detects a disconnection of the external memory 200.

As described above, according to the first embodiment, when the user suspends input during the input of the setting information, or when the user logs out of the multifunction machine 100, the leakage of the setting information to other users can be prevented by deleting the setting information that was input by the user. Also when the user subsequently uses the multifunction machine 100 again, it is possible to reproduce the setting information that was input right before the user was logged out of the multifunction machine 100.

[Second Embodiment]

Figure 12:
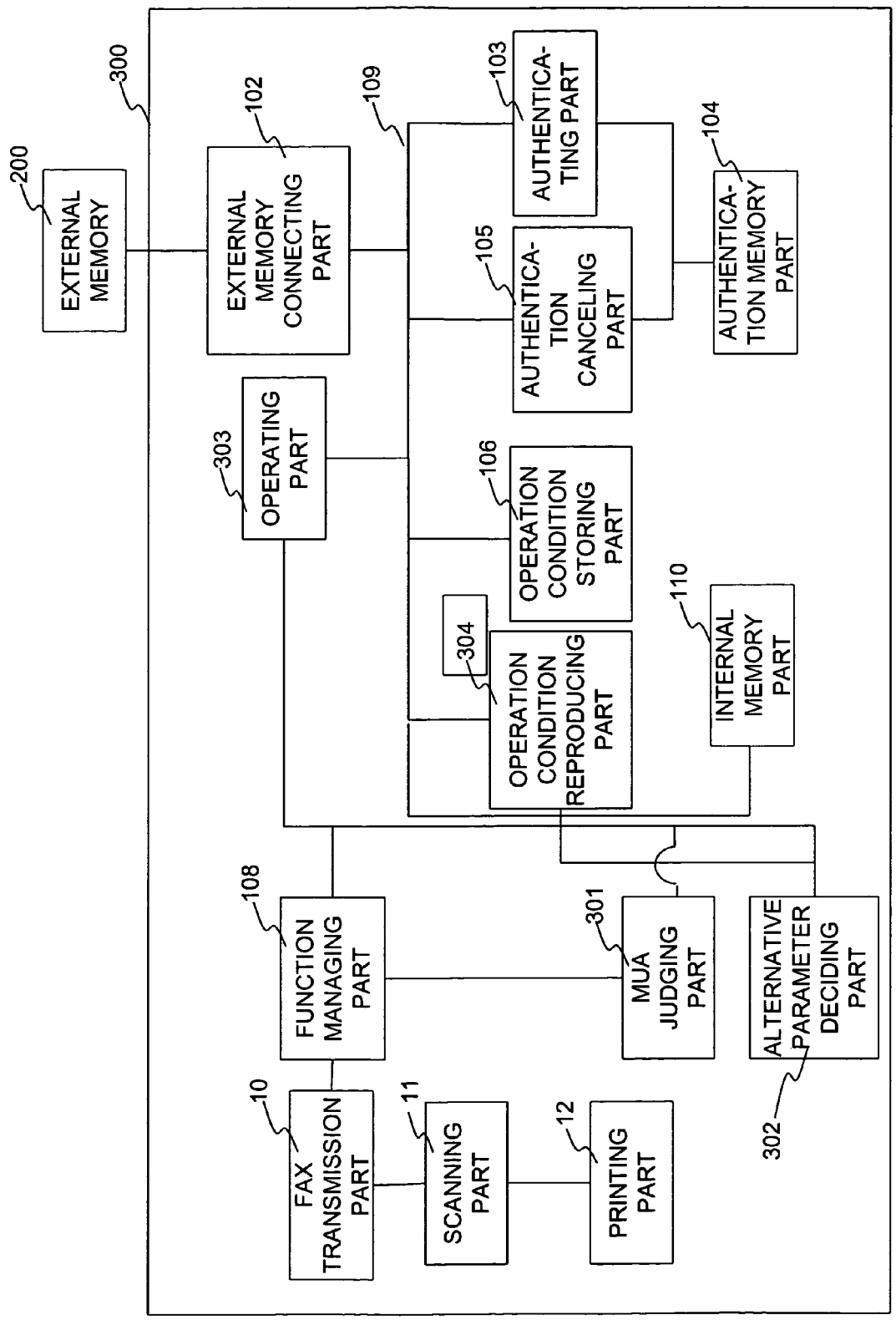
FIG. 12 is a schematic block diagram of the structure of another multifunction machine.

The second embodiment is explained with two multifunction machines that have different structures. The multifunction machine 300 of the second embodiment, as shown in FIG. 12, includes a machinery usage ability judging part 301 (MUA judging part 301) that judges whether or not the function requested by the user is executable, an alternative parameter deciding part 302 that judges whether or not the setting value of the function that was requested by the user is possible to set, an operating part 303 that is an alternate of the operating part 101 of the multifunction machine 100, and an operation condition reproducing part 304 that is an alternate of the operation condition reproducing part 107. Other structures are the same as the multifunction machine 100 of the first embodiment.

Figure 13:
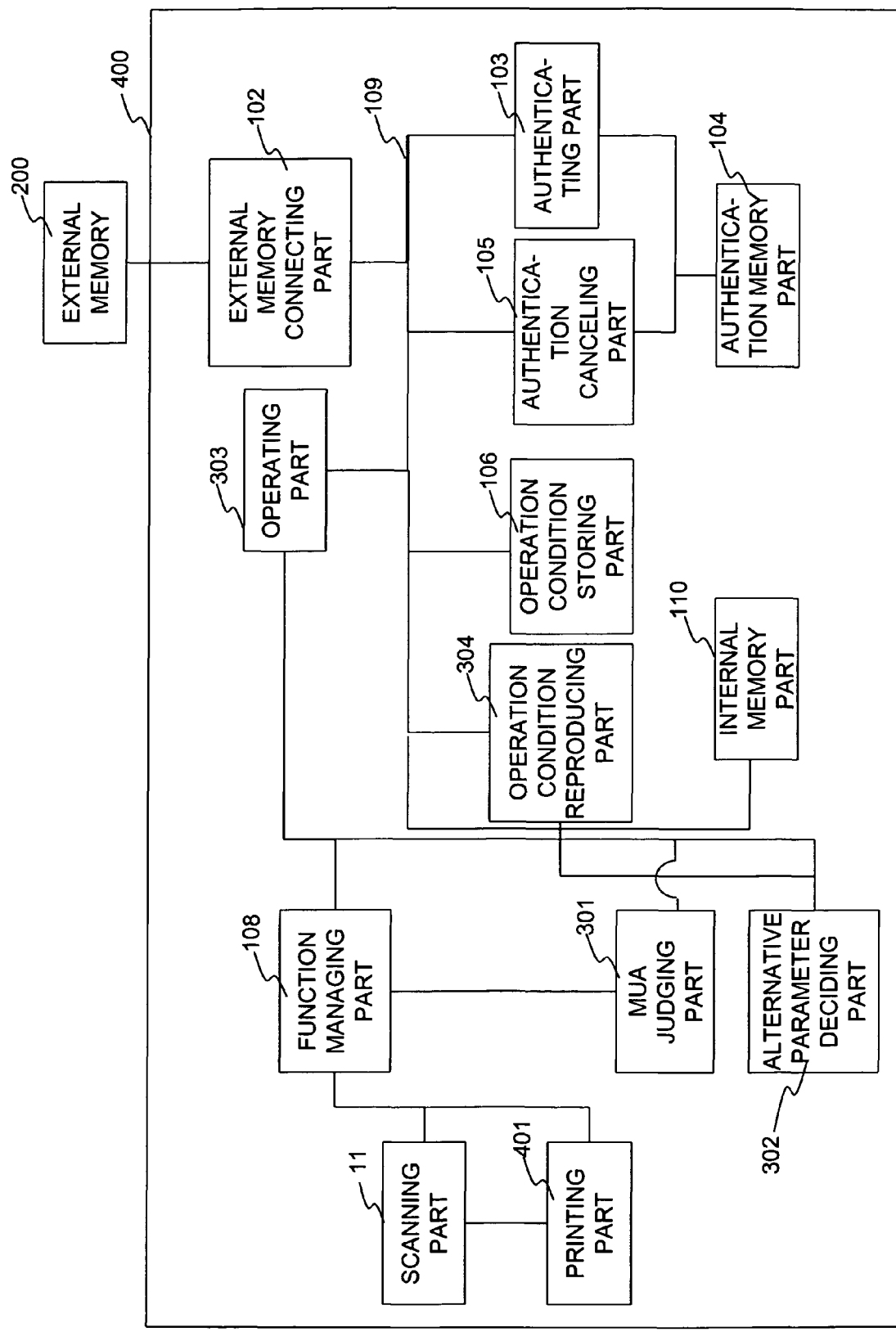
FIG. 13 is a schematic block diagram of the structure of yet another multifunction machine.

Moreover, the multifunction machine 400, as shown in FIG. 13, includes the machinery usage ability judging part 301 (MUA judging part 301), the alternative parameter deciding part 302, the operating part 303 that is an alternate of the operating part 101 of the multifunction machine 100 of the first embodiment, the operation condition reproducing part 304 that is an alternate of the operation condition reproducing part 107, and a printing part 401 that is an alternate of the printing part 12. The structure of the multifunction machine 400 is the same as the multifunction machine 100 except that it does not includes the fax transmission part. The same reference numbers are used for the same parts as the first embodiment; therefore the explanation of these parts is omitted.

The MUA judging part 301 judges whether or not the function requested by the user is executable (or possible to execute) based on the order from the operation condition reproducing part 304 and based on the function structure elements such as fax transmission, scanning and printing that are operated by the function managing part 108.

The alternative parameter deciding part 302 judges whether or not setting values for functions such as fax transmission, scanning and printing that were requested by the user are possible to set. When not possible to set, these setting values are changed to the alternative parameters. The initial value(s) that is/are maintained by the multifunction machines 300 or 400 are used for the alternative parameters.

The operating part 303 orders the display devices, such as a liquid crystal display (LCD) that is not shown in the figure, to display each type of setting screen. Each type of setting screen has a unique name for identification purposes. Moreover, the operating part 303 accepts the input of setting information made by the user through each type of setting screen that is displayed by the display device. For example, a touch panel that is equipped with the display device can be used to accept the input of the setting information of the user. Then the setting information input through the touch panel is stored in the internal memory part 110. Moreover, the operating part 303 performs hatching of the background of a portion where the setting content is displayed when the setting value that is going to be displayed is the setting that was changed by the alternative parameter deciding part 302.

The operation condition reproducing part 304 orders the external memory connecting part 102 to read the setting information and the screen condition or the like that are stored in the external memory 200 when the user whose authentication was once canceled is authenticated again. The operation condition reproducing part 304 orders the operating part 303 to reproduce the screen condition stored just before the user's authentication was canceled based on the setting information and the screen condition that were read. Moreover, the operation condition reproducing part 304 instructs the MUA judging part 301 to judge whether or not the operation condition that is going to be reproduced is executable (or possible to reproduce). However, if the result of the judgment is that the condition is not executable, the operation condition reproducing part 304 does not reproduce the operation condition. Moreover, the operation condition reproducing part 304 orders the alternative parameter deciding part 302 to change the setting value of the function to be executed.

The printing part 401 of the multifunction machine 400 has a sheet tray that contains sheets of printing paper, a pick-up roller that picks up the sheets from the sheet tray, transportation rollers that transport the sheets, an endless transportation belt that conveys the sheets toward an image forming unit, the electrophotographic image forming unit that forms a toner image based on the input digital signal on the sheets, a fixing unit that fixes the toner image that is formed on the sheets, discharge rollers that discharge the sheets in which the toner image is fixed to the outside, a drive part that drives each of the rollers and, a power part that applies a high voltage to the predetermined members that construct the printing unit or the fixing unit. When these members operate together, the image input by the scanning part 11 can be printed on the sheets. However, the printing part 401 cannot execute the output that corresponds to the value of HIGH with the IMAGE QUALITY that is the setting value of the copy function. In short, the printing part 401 cannot execute copying having IMAGE QUALITY with setting value of the copy function of HIGH.

By having each of aforementioned members operating uniformly, the user can restart the operation with another multifunction machine even if the multifunction machine, from which the user logged out most recently, is being used by another user.

Figure 14:
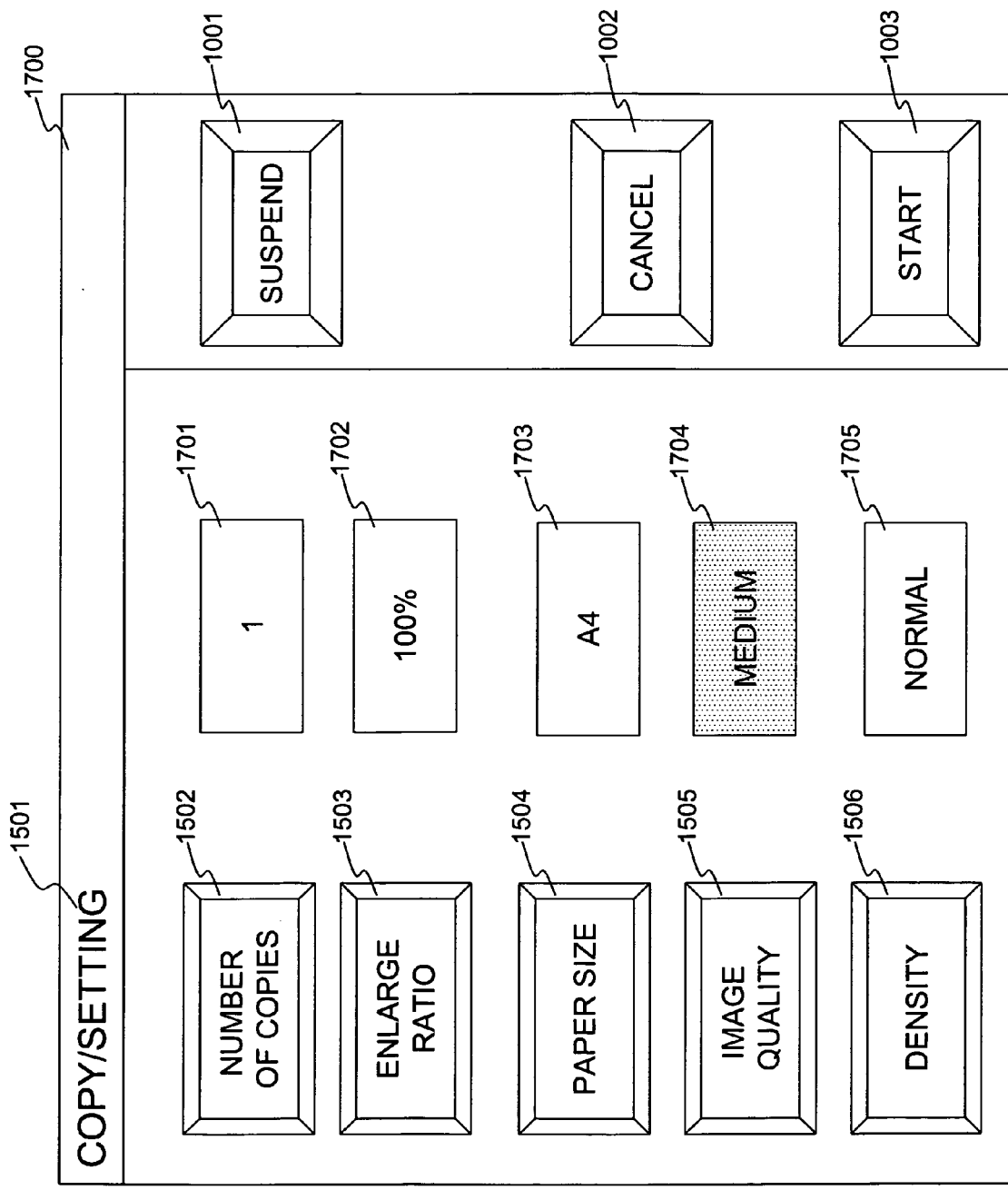
FIG. 14 illustrates the copy setting screen displayed by the operating part of the multifunction machines in FIGS. 12 and 13.

Next, the input of the setting of information made by the user and the display screen that is displayed by the operating part 303 during input of the setting information are explained. FIG. 14 illustrates a copy setting screen 1700 that is displayed by the operating part 303 after the COPY button 1203 is pressed at the function selection screen 1200, as explained in the first embodiment. The copy setting screen 1700 includes a title bar 1501, setting value buttons 1502-1506, setting value display boxes 1701-1705, a SUSPEND button 1001, a CANCEL button 1002 and a START button 1003. As functions of each part are the same as in the explanation of the first embodiment, the explanations are omitted. However, when the setting value is a value changed by the alternative parameter deciding part 302, a background of the setting value display boxes 1701-1705 is hatched.

Figure 15:
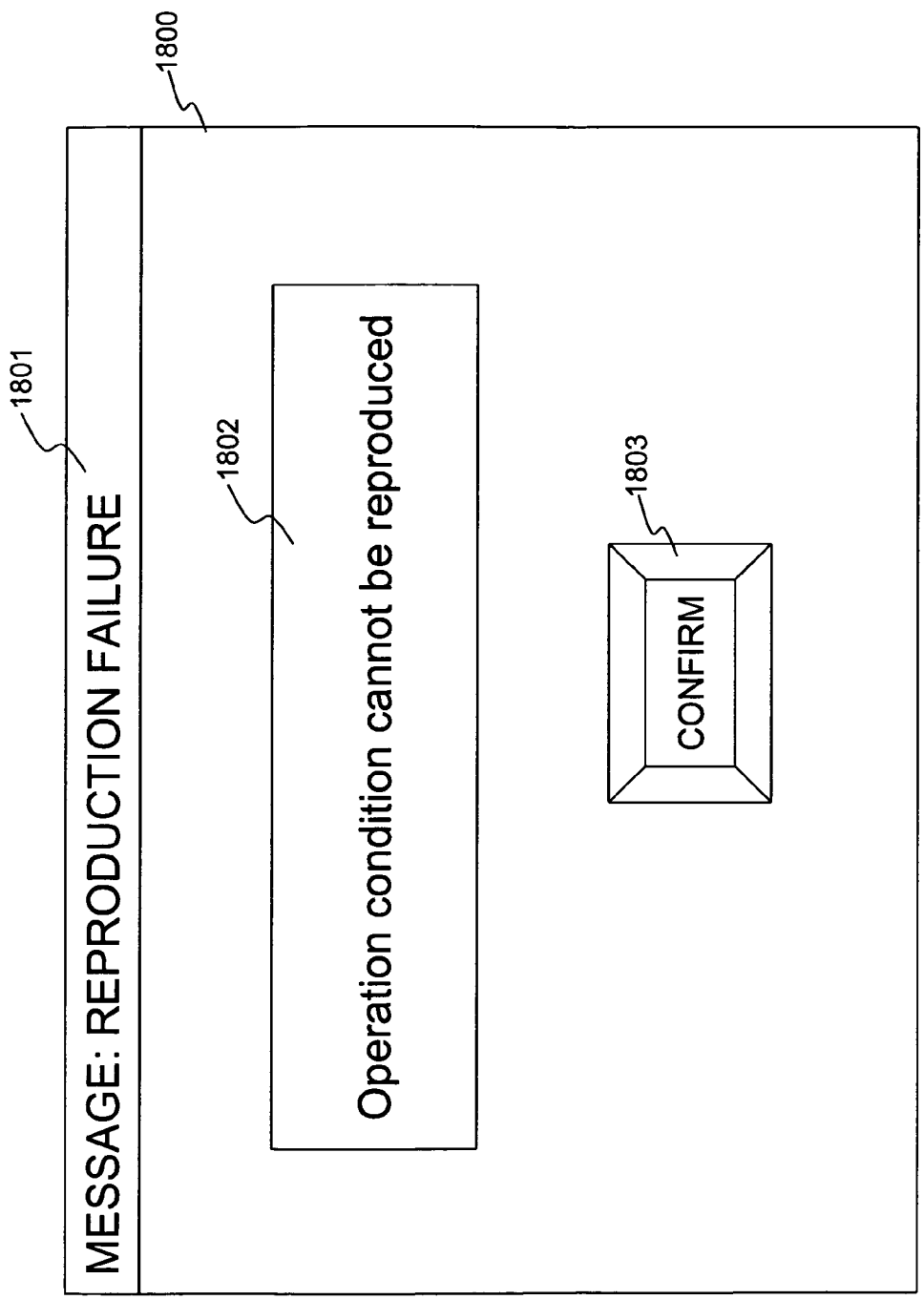
FIG. 15 illustrates an operation condition reproduction failure screen.

FIG. 15 explains an operation condition reproduction failed screen 1800. The operation condition reproduction failed screen 1800 is the screen that is displayed when the operation condition reproducing part 304 failed to reproduce the operation condition, and includes a title bar 1801, a message box 1802 and a CONFIRM button 1803.

On the title bar 1801, MESSAGE: REPRODUCTION FAILURE, which is a name of the screen, is displayed. In the message box 1802, the message, "Operation condition cannot be reproduced," is displayed as the message to the user. The CONFIRM button 1803 accepts a response from the user. When the CONFIRM button 1803 is pressed by the user, the operating part 303 switches the display to the function selecting screen 1200.

Figure 16:
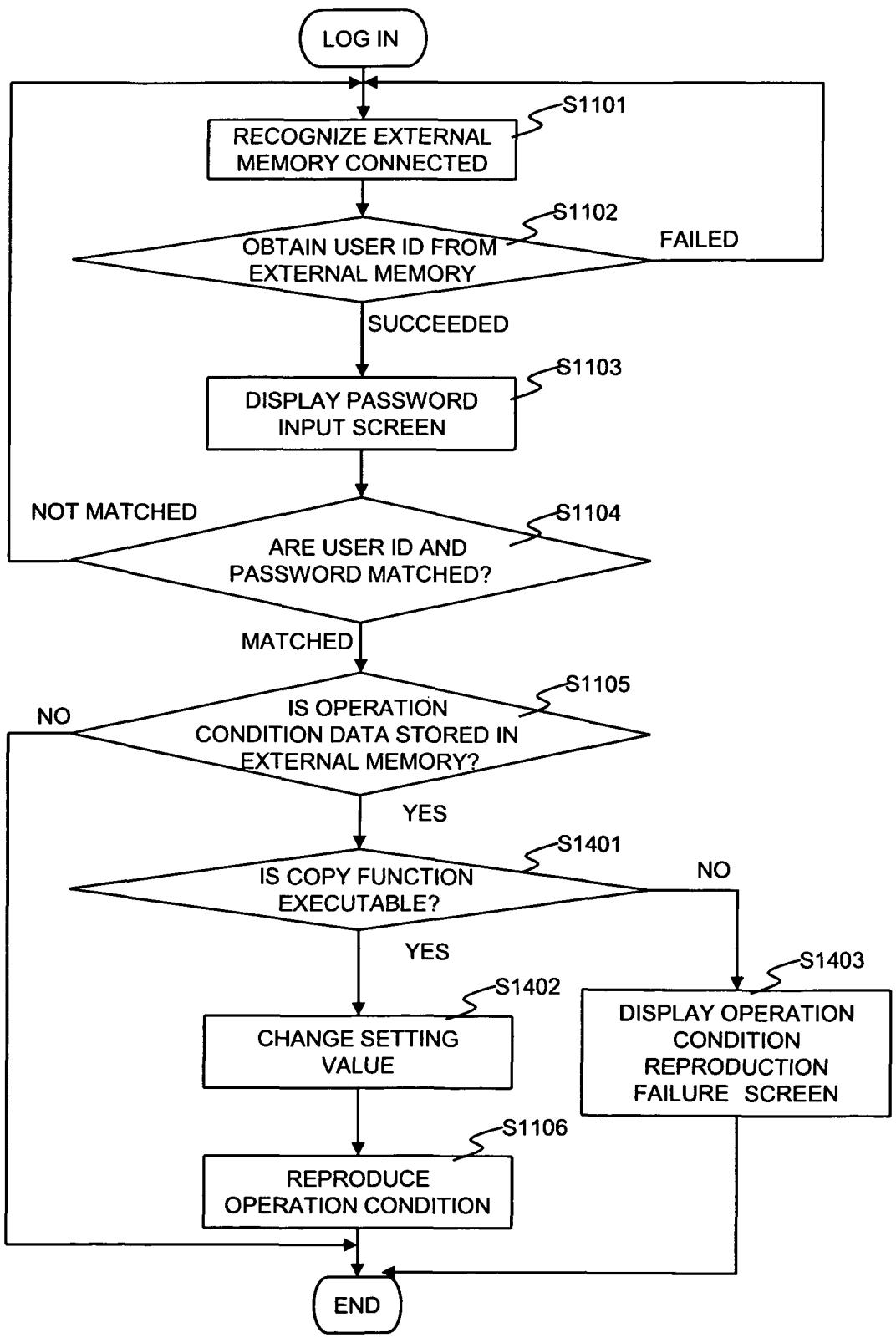
FIG. 16 is a flow diagram explaining processing of the login of the user, fax transmission and the copy function processing.

The processing that is executed by the multifunction machines 300 and 400 of the foregoing embodiments is explained with reference to FIG. 16. FIG. 16 is a flow diagram illustrating processing that has been explained in the first embodiment, 1) processing of the login of the user; and 2) fax transmission or copy function processing. Further, it is assumed in the embodiment that 3) suspension by the user, which is illustrated in FIG. 11, has already been executed by the multifunction machine 300. Further, it is also assumed that the operation condition data 501, which is shown in FIG. 17, has already been stored in the external memory 200. Further, FIG. 16 illustrates the operation condition data 501 that is stored in the memory 200 when the user logs out of the multifuinction machine 300 after the image quality was set at HIGH on the copy setting screen 1700 by the user.

First, when the external memory 200 is connected to the multifunction machine 400 by the user, the external memory connection part 102 recognizes that the external memory 200 is connected (S1101).

Next, at S1102, the external memory connecting part 102 obtains a user ID that is stored in the external memory 200. Here, when the external memory connecting part 102 fails to obtain the user ID, the external memory connecting part 102 waits until the external memory 200 is reconnected to the multifunction machine 400 (S1102, FAILED). When the user ID was successfully obtained, the external memory connecting part 102 informs the operating part 303 and the authenticating part 103 that the user ID is obtained (S1102, SUCCEEDED).

The operating part 303, which accepted a notification of obtaining the user ID from the external memory connecting part 102, displays the password input screen 1100 on the display device (S1103). When the password is input by the user, the operating part 303 informs the input password to the authenticating part 103. Next, the authenticating part 103 performs authentication of the user referring to the user information that is stored in the authentication memory part 104 based on the user ID obtained by the external memory connecting part 102 and the password that was accepted by the operating part 303. Here, when the user is authenticated by the authenticating part 103, the authenticating part 103 instructs the authentication memory part 104 to store the user ID and informs the operation condition reproducing part 304 that the user is authenticated (S1104, MATCHED). On the other hand, when the user is not authenticated by the authenticating part 103, it waits until the external memory part 200 is reconnected to the multifunction machine 400 (S1104, NOT MATCHED).

The operation condition reproducing part 304 informed by the authenticating part 103 that the user is authenticated orders the external memory connecting part 102 to confirm whether or not the operation condition data is stored in the external memory part 200. Here, when the operation condition is not stored in the external memory part 200, the operation condition reproducing part 304 completes the processing and informs the operating part 303 of the same. The operating part 303 that was informed from the operation condition reproducing part 304 displays the function selecting screen 1200 on the display device (S1105, NO).

On the other hand, when the operation condition data is stored in the external memory 200 (S1105, YES), the operation condition reproducing part 304 instructs the external memory connecting part 102 to read the operation condition data 501. The operation condition reproducing part 304 instructs the MUA judging part 301 in order to judge whether or not the copy function is executable with the multifunction machine 400 based on the operation condition data 501 that was read from the external memory connecting part 102 (S1401). The MUA judging part 301 inquires to the function managing part 108 regarding functions of the multifunction machine 400. Because the multifunction machine 400 includes the printing part 401 as shown in FIG. 13, the MUA judging part 301 judges that the copy function is executable (S1402, YES), and informs the operation condition reproducing part 304 of the judgment. The operation condition reproducing part 304 instructs the alternative parameter deciding part 302 to refer the "Setting value of function" in the operation condition data 501 so that the alternative parameter deciding part 302 is able to replace the setting value with the initial value that is maintained in by the multifunction machine 400 if it is not a possible setting value. The alternative parameter deciding part 302 changes the setting value IMAGE QUALITY from HIGH to MEDIUM (S1402).

The operation condition reproducing part 304 reproduces the operation condition based on the operation condition data 501 provided by the external memory connecting part 102 and the setting values changed by the alternative parameter deciding part 302 (S1106). In detail, the operation condition reproducing part 304 orders the operating part 303 to display the copy setting screen 1700 because the attribute, "screen name" of "display condition" that is stored in the operation condition data 501 is COPY/SETTING. Moreover, the operation condition reproducing part 304 orders the operating part 303 to hatch the setting value display box 1704 that corresponds to the IMAGE QUALITY that was changed by the alternative parameter deciding part 302. The operating part 303 that accepted the order displays the copy setting screen 1700, and displays the hatching on the setting value display box 1704.

Moreover, the operation condition reproducing part 304 sets the following: the number of copies 1; enlargement ratio: 100%; document size A4; the image quality MEDIUM; and density NORMAL as the setting values of the copy function from each of the "function name" that is the attribute of the "Setting value of function" and the "setting value" that is a sub-element that are stored in the operation condition data 501.

After this, copying is started by the user by clicking the START button 1003. In short, the scanning part 11 starts reading with the setting of the document size A4 with the image quality MEDIUM and the density NORMAL. The output analog image signals are converted into digital signals and then supplied to the printing part 401. The printing part 401 converts the digital signals into the image information and executes the printing of the image information.

After the copy function is executed by the printing part 401, the function managing part 108 notifies the authentication canceling part 105 that the copy function is completed. The authentication canceling part 105 cancels the authentication of the user and logs the user out, and also removes the operation condition data 501 that is stored in the internal memory part 110. Moreover, the authentication canceling part 105 orders the operating part 303 to suspend the display of the screen that is currently being displayed.

On the other hand, at S1401, when the MUA judging part 301 judges that the copy function is not executable, (S1402, NO), the operation condition reproducing part 304 orders the operating part 303 to display the operation condition reproduction failure screen 1800, and ends the processing.

As described above, according to the second embodiment, in addition to the effects of the first embodiment, it is possible to restart the processing using another multifunction machine; the user can restart the operation using another multifunction machine even when the multifunction machine that was used before the user logged out is being used by another user.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An information processing device comprising:
a processor, the processor being configured
to receive, in an authenticating part, from interaction with a user an input of first identification information, to read second identification information from an external memory medium, to determine whether the first identification information and the second identification information are collated, to authenticate the user when the first identification information and the second identification information are determined to be collated, and to not authenticate the user when the first identification information and the second identification information are determined not to be collated;
to cancel, in an authentication canceling part, the authentication of the user authenticated by the authenticating part and to remove setting information and screen information input by the user;
to store, by an operation condition storing part, the setting information and the screen information input by the user in the external memory medium when the authentication canceling part cancels the authentication of the user; and
to determine, in a reproducing part, whether or not the setting information and the screen information are stored in the external memory medium when the authenticating part authenticates the user, to read the setting information and the screen information from the external memory medium when the setting information and the screen information are determined to be stored, and to reproduce an operation condition based on the setting information and the screen information that were read from the external memory medium;

wherein the reproducing part sets the operation condition to a non-user-specific-situation display screen to select one of plural functions, instead of to a user-situation-specific display screen based on the setting information and the screen information read from the external memory medium, when the user is authenticated by the authenticating part and the setting information and the screen information are determined to be not stored in the external memory medium.

2. The information processing device of claim 1, wherein the external memory further stores user information; and
the authenticating part authenticates the user based on the user information read from the external memory medium.

3. The information processing device of claim 1, wherein the external memory medium is detachable to the information processing device.

4. The information processing device of claim 1, further comprising:
a judging part that judges whether or not the reproduction of the operation condition is possible by the reproducing part.

5. The information processing device of claim 4, further comprising:
an alternative parameter deciding part that changes a portion of the operation condition that cannot be reproduced by the reproducing part into a default setting.

6. The information processing device of claim 5, further comprising:
an operating part that has a screen; wherein
the operating part displays the portion of the operation condition on the screen differently from other portions.

7. The information processing device of claim 6, wherein the operating part displays the portion of the operation condition on the screen with a hatching background.

8. The information processing device of claim 4, wherein the judging part displays an operation condition reproduction failure screen, when the judging part judges that the reproduction of the operation condition is not possible.

9. The information processing device of claim 1, further comprising:
a function managing part that executes image processing based on the operation condition that was reproduced by the reproducing part.

10. The information processing device of claim 9, wherein the function managing part instructs at least one of a fax transmission part, a scanning part and a printing part to execute the image processing.

11. The information processing device of claim 1 wherein the operation condition that is reproduced by the reproducing part includes at least one of an image transmission destination, a document size, an image quality and an image density.

12. The information processing device of claim 1, wherein the operation condition that is reproduced by the reproducing part includes at least one of the number of copies, an image enlargement ratio, a paper size, an image quality and an image density.

13. The information processing device of claim 1, wherein the reproducing part
reads, from the external memory medium, the setting information and the screen information which were previously input by the user and previously stored in the external memory medium by the operation condition storing part when the authentication of the user was canceled, when the authenticating part authenticates the user, and orders the operating part to reproduce a condition of screen from the screen information read from the external memory medium which was previously input by the user instead of from current input by the user so as to reproduce an operation condition based on the setting information and the screen information that was previously input by the user when the authentication of the user was canceled, when the external memory medium is present and the authenticating part again authenticates the user whose authentication was canceled, the condition of screen being values previously set by the user in screens for fax transmission setting and copy setting.

14. The information processing device of claim 13, wherein
the reproducing part does not order the operating part to reproduce the condition of screen from the screen information read from the external memory medium which was previously input by the user whose authentication was canceled, in the following situations:
(i) the external memory medium is not present,
(ii) the reproducing part is not able to read the setting information and the screen information that was previously input by the user from the external memory medium, and
(iii) the authenticating part does not again authenticate the user whose authentication was canceled.

15. The information processing device of claim 1, further comprising
a machinery usage ability judging part that judges whether or not a function is executable;
an alternative parameter deciding part that changes a portion of the operation condition that cannot be reproduced by the reproducing part into a default setting;
a judging part that judges whether or not the operation condition can be reproduced by the reproducing part into the default setting when the function is judged to be executable, and does not judge whether the operation condition can be reproduced when the function is not judged to be executable.

16. The information processing device of claim 1, further comprising:
a judging part configured to determine whether or not an operation function in the setting information and the screen information is executable by the information processing device,
the reproducing part is further configured to display an operation condition failure screen when the operation function is determined not to be executable, and
when the operation function is determined to be executable, the reproducing part is further configured to
determine whether a setting value specified in the setting information for the operation function is possible on the information processing device,
replace the setting value with a default value stored in the information processing device when the setting value is not possible on the information processing device, and reproduce the operation condition based on the setting information provided by the external memory when the setting value is possible on the information processing device.

17. A method of providing access to a user of an information processing device, comprising:
authenticating that receives from interaction with a user an input of first identification information, that reads second identification information from an external memory device, determines whether the first identification information and the second identification information are collated, authenticates the user when the user logs in the multifunction device and the first identification information and the second identification information are determined to be collated, and does not authenticate the user when the first identification information and the second identification information are determined not to be collated;
externally storing setting information and screen information input by the user when the user logs out or when the user suspends device operation;
canceling authentication of the user that is authenticated and deleting the setting information and the screen information;
confirming whether or not the setting information and the screen information are stored in the multifunction device when the user logs out or when the user suspends device operation, reading the setting information and the screen information from the multifunction device when the setting information and the screen information are stored; and
enabling a function included in the multifunction device corresponding to the stored setting information and the stored screen information; and
setting an operation condition to a non-user-specific-situation display screen to select functions of the multifunction device, instead of to a user-situation-specific display screen based on the setting information and the screen information read from the external memory device, when the user is authenticated and the setting information and the screen information are determined to be not stored in the multifunction device.

18. The method of claim 17, wherein
automatically initiating the reproducing of the setting information when the external memory device is connected to the multifunction device.

19. The method of claim 18, wherein
reproducing the setting information and the screen information by reading the setting information and the screen information from the external memory device.

20. The method of claim 17, wherein
the setting information comprises at least one of information with respect to the number of copies, an enlargement ratio, a paper size for printing, an image quality, and an image density.

21. The method of claim 17, further comprising:
judging whether or not an operation condition based on the setting information is possible to operate after the reproducing the setting information,
changing the operation condition when the operation condition is judged not to be possible before the enabling of a function.

22. An information processing device comprising:
a processor, the processor being configured
to receive, in an authentication part, from interaction with a user an input of first identification information, to read second identification information from an external memory medium, to determine whether the first identification information and the second identification information are collated, to authenticate the user when the first identification information and the second identification information are determined to be collated, and to not authenticate the user when the first identification information and the second identification information are determined not to be collated;
to receive, in a setting part, an input of setting information by the user authenticated by the authenticating part;
to cancel, in an authentication canceling part, the authentication of the user authenticated by the authenticating part;
to store, by an operation condition storing part, the setting information input by the user into the external memory medium when the authentication canceling part cancels the authentication of the user; and
to determine, in a reproducing part, whether or not the setting information is stored in the external memory medium when the authenticating part authenticates the user, to read the setting information from the external memory medium when the setting information is determined to be stored, and to reproduce an operation condition based on the setting information that was read from the external memory medium;
wherein the reproducing part sets the operation condition to a non-user-specific-situation display screen to select one of plural functions, instead of to a user-situation-specific display screen based on the setting information read from the external memory medium, when the user is authenticated by the authenticating part and the setting information is determined to be not stored in the external memory medium.

23. The information processing device of claim 22, further comprising:
a judging part that judges whether or not the reproduction of the operation condition is possible by the reproducing part; and
an alternative parameter deciding part that changes a portion of the operation condition which is judged to be not reproducible by the reproducing part into a default setting.

24. The information processing device of claim 22, further comprising:
a judging part configured to determine whether or not an operation function in the setting information is executable by the information processing device,
the reproducing part is further configured to display an operation condition failure screen when the operation function is determined not to be executable, and
when the operation function is determined to be executable, the reproducing part is further configured to
determine whether a setting value specified in the setting information for the operation function is possible on the information processing device,
replace the setting value with a default value stored in the information processing device when the setting value is not possible on the information processing device, and
reproduce the operation condition based on the operation condition data provided by the external memory when the setting value is possible on the information processing device.

25. An information processing device comprising:
a processor, the processor being configured
to receive, in an authenticating part, from interaction with a user an input of first identification information, to read second identification information from an external memory medium, to determine whether the first identification information and the second identification information are collated, to authenticate the user when the first identification information and the second identification information are determined to be collated, and to not authenticate the user when the first identification information and the second identification information are determined not to be collated;

to receive, in a setting part, an input of screen information by the user authenticated by the authenticating part;

to cancel, in an authentication canceling part, the authentication of the user authenticated by the authenticating part;

to store, by an operation condition storing part, the screen information input by the user into the external memory medium when the authentication canceling part cancels the authentication of the user; and to determine, in a reproducing part, whether or not the screen information is stored in the external memory medium when the authenticating part authenticates the user, to read the screen information from the external memory medium when the screen information is determined to be stored, and to reproduce a condition of screen based on the screen information that was read from the external memory medium;

wherein the reproducing part sets the condition of screen to a non-user-specific-situation display screen to select one of plural functions, instead of to a user-situation-specific display screen based on the screen information read from the external memory medium, when the user is authenticated by the authenticating part and the screen information is determined to be not stored in the external memory medium.

26. The information processing device of claim 25, wherein, the condition of screen comprises values previously set by the user in screens for fax transmission setting and copy setting.

* * * * *